United States Patent
Fontaine

(10) Patent No.: US 10,456,992 B2
(45) Date of Patent: Oct. 29, 2019

(54) MODULAR USER-CONFIGURABLE MULTI-PART 3D LAYERING SYSTEM AND HOT END ASSEMBLY

(71) Applicant: Stacker, LLC, Plymouth, MN (US)

(72) Inventor: Norston Fontaine, Plymouth, MN (US)

(73) Assignee: Stacker, LLC, Plymouth, MN (US)

( * ) Notice: Subject to any disclaimer, the term of this patent is extended or adjusted under 35 U.S.C. 154(b) by 795 days.

(21) Appl. No.: 14/845,803

(22) Filed: Sep. 4, 2015

(65) Prior Publication Data

US 2016/0067920 A1   Mar. 10, 2016

Related U.S. Application Data

(60) Provisional application No. 62/046,016, filed on Sep. 4, 2014, provisional application No. 62/194,510, filed on Jul. 20, 2015.

(51) Int. Cl.

| | |
|---|---|
| *B29C 64/386* | (2017.01) |
| *B29C 67/00* | (2017.01) |
| *B29C 64/106* | (2017.01) |
| B33Y 10/00 | (2015.01) |
| B33Y 30/00 | (2015.01) |
| B33Y 50/02 | (2015.01) |

(52) U.S. Cl.
CPC ........ *B29C 67/0088* (2013.01); *B29C 64/106* (2017.08); *B29C 64/386* (2017.08); *B33Y 10/00* (2014.12); *B33Y 30/00* (2014.12); *B33Y 50/02* (2014.12)

(58) Field of Classification Search
CPC . B29C 67/0088; B29C 64/386; B29C 64/106; B33Y 10/00; B33Y 30/00; B33Y 50/02
See application file for complete search history.

(56) References Cited

U.S. PATENT DOCUMENTS

| | | | |
|---|---|---|---|
| 8,033,811 B2 | 10/2011 | Swanson et al. | |
| 2004/0036726 A1 | 2/2004 | Zach | |
| | | (Continued) | |

FOREIGN PATENT DOCUMENTS

EP         2851179 A1      3/2015

*Primary Examiner* — Timothy Kennedy
*Assistant Examiner* — John Robitaille
(74) *Attorney, Agent, or Firm* — Craige Thompson; Thompson Patent Law

(57) ABSTRACT

Apparatus and associated methods for a user configurable modular 3D layering system provide a modular frame assembly, and two or more deposition print heads that are user-configurably disposed along an X-axis carriage drive system. A deposition-receiving tray may have a configurable Z-axis throw. In an exemplary embodiment, an X-axis carriage drive system may include one or more sensors for detecting a starting position of the print heads. For example, the sensor may be a micro-switch engageable by one or more print heads. In an exemplary embodiment, the print heads are removable from the X-axis carriage assembly. In some embodiments, each print head may operate independently of adjacent print heads. In an exemplary embodiment, each print head may include an injection nozzle for depositing the filament. In some embodiments, a y-carriage assembly may include a height sensor for the tray.

14 Claims, 28 Drawing Sheets

(56) References Cited

U.S. PATENT DOCUMENTS

| | | |
|---|---|---|
| 2010/0021580 A1* | 1/2010 | Swanson .............. B29C 31/042 |
| | | 425/132 |
| 2010/0217429 A1 | 8/2010 | Kritchman et al. |
| 2012/0105534 A1 | 5/2012 | Boday et al. |
| 2013/0078073 A1 | 3/2013 | Comb et al. |
| 2014/0134333 A1 | 5/2014 | Hedges |
| 2014/0210137 A1 | 7/2014 | Patterson et al. |

* cited by examiner

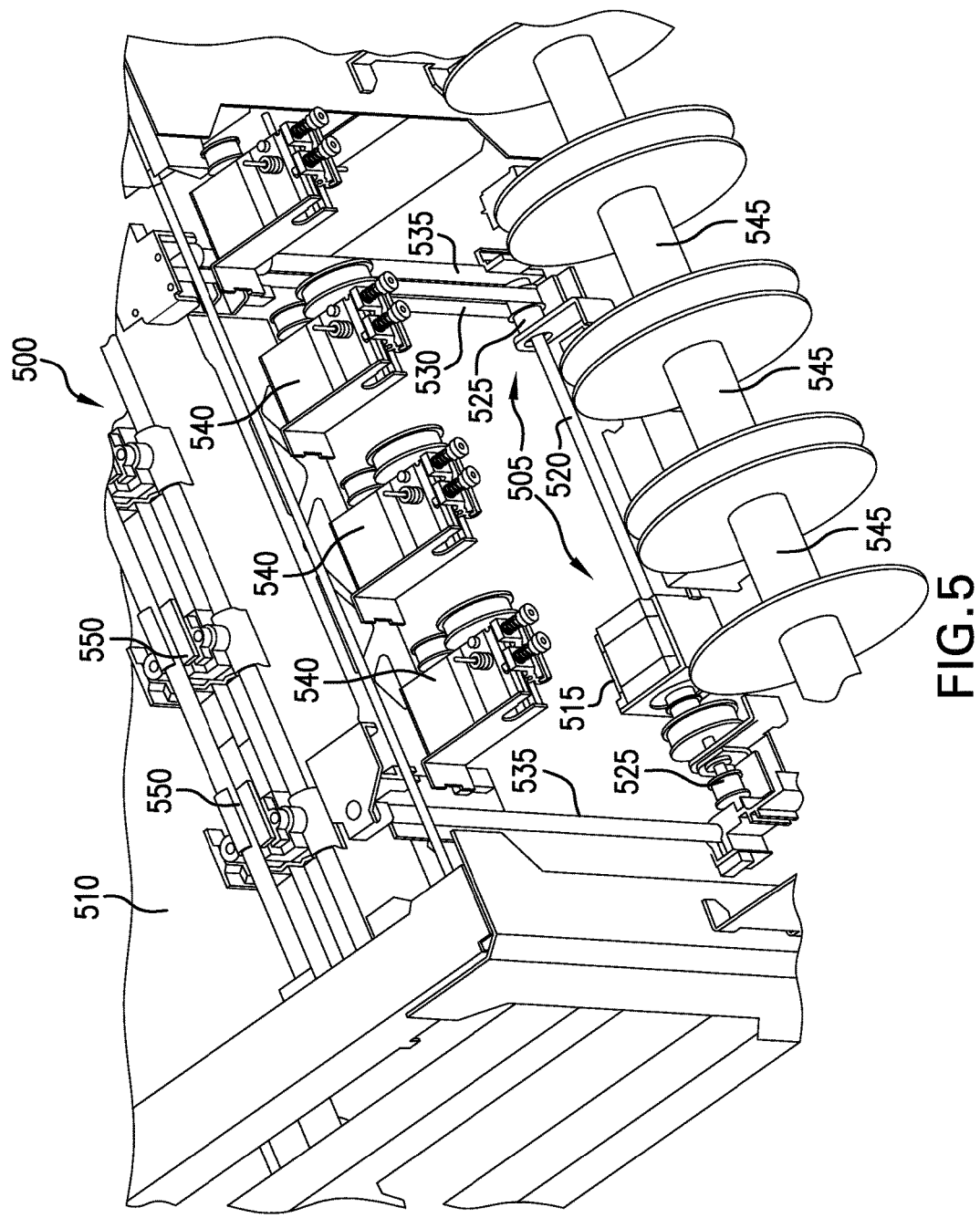

MODULAR USER-CONFIGURABLE MULTI-PART 3D LAYERING SYSTEM AND HOT END ASSEMBLY

CROSS-REFERENCE TO RELATED APPLICATIONS

This application claims the benefit of U.S. Provisional Application Ser. No. 62/046,016, titled "User Configurable Modular 3D Layering System," filed by Fontaine, N., on Sep. 4, 2014, and U.S. Provisional Application Ser. No. 62/194,510, titled "Low Friction, Groove Mount Hot End Assembly," filed by Fontaine, N., on Jul. 20, 2015.

The entirety of each of the foregoing applications is hereby incorporated by reference.

TECHNICAL FIELD

Various embodiments relate generally to layered deposition systems, including 3D printing apparatus for fabricating 3D objects using layer-based techniques.

BACKGROUND

Prototypes for mechanical designs are used by engineers during product development. Engineers can test how a part will fit or operate by building a prototype. Prototypes can reveal things that were unanticipated by the designer. Some prototypes are made to as a miniaturized model so as to be less unwieldy or less expensive. Still, even miniaturized prototypes can be instructive to the designer or user. Prototypes can be used to test how a hand-held device will feel in the hands of a user. Prototypes can facilitate the development of a part that must interface with another part. For example a prototype may be given to a vender who has contracted making a part to which the prototype must couple.

Three-dimensional (3D) printing can be performed to produce prototypes of designs. 3D printers may use fused deposition modeling to deposit materials. In fuse deposition modeling, a part may be produced by extruding small diameter beads of liquid material that harden soon after deposition. 3D printers may use granular materials binding methods that selectively fuse materials in a granular bed. Layers of granules are added to the granular bed and the fusing process is then repeated. Lamination techniques have been used by 3D printers to adhere layers of paper or other material in layers. Photopolymerization has been used to selectively polymerize a bath of material. Where the bath experience a light of a certain intensity, polymerization occurs.

SUMMARY

Apparatus and associated methods relate to a PTFE liner inserted into a filament path and extending distally into a hot end nozzle so that its terminal end is located substantially proximate or in the glass transition zone of the filament during deposition via the nozzle.

Apparatus and associated methods for a user configurable modular 3D layering system provide a modular frame assembly, one or more deposition print heads that are user-configurably disposed along an X-axis carriage drive system, and a deposition-receiving tray that has a configurable Z-axis throw. In an exemplary embodiment, an X-axis carriage drive system may include one or more sensors for detecting a starting position of the print heads. For example, the sensor may be a micro-switch engageable by one or more print heads. In an exemplary embodiment, the print heads are removable from the X-axis carriage assembly. In some embodiments, each print head may operate independently of adjacent print heads. In an exemplary embodiment, each print head may include an injection nozzle for depositing the filament. In some embodiments, a y-carriage assembly may include a height sensor for the tray.

Apparatus and associated methods relate to a configurable X-carriage for a 3D printer, the X-carriage having a guiding rod and an X-drive belts, each adapted to receive one or more print heads disposed along a longitudinal length of the X-carriage. In an illustrative embodiment, the longitudinal length may define an X-domain of operation for depositing material to create 3D products. The X-domain may be divided among one or more print heads removeably coupled along the longitudinal length. In some embodiments, a plurality of removeably coupled print heads may be operated in a substantially identical fashion to create identical copies of a 3D products. In an exemplary embodiment, a plurality of removeably coupled print heads may be operated in a cooperative fashion to create a single 3D product from materially applied from the plurality of removeably coupled print heads. The configurable X-axis may advantageously optimize the use of 3D print resources.

Apparatus and associated methods may relate to a configurable Y-drive system for a 3D printer, the Y-drive system having a guiding rod and a Y-drive belts, each adapted to receive one or more X-carriages disposed along a longitudinal length of the Y-drive system. In an illustrative embodiment, the longitudinal length may define a Y-domain of operation for depositing material to create 3D products. The Y-domain may be divided among the plurality of X-carriages removeably coupled along the longitudinal length. In some embodiments, each of the plurality of removeably coupled X-carriages may be operated in a substantially identical fashion to create identical copies of a 3D products. In an exemplary embodiment, a plurality of removeably coupled X-carriages may be operated in a cooperative fashion to create a single 3D product from materially applied from the plurality of print heads distributed across different X-carriages. The configurable Y-axis may advantageously optimize the use of 3D print resources.

Apparatus and associated methods may relate to a configurable Z-drive system for a 3D printer, the Z-drive system having a Z-axis throw that is user-configurable by selecting a one or more stackable support frames and attaching one or more guide rods and one or more Z-drive belts each having Z-dimensions corresponding to a Z-dimension of the selected stackable support frames. In an illustrative embodiment, a deposition-receiving tray may be coupled to the attached one or more guide rods and one or more Z-drive means. The deposition-receiving tray may be driven along the Z-throw corresponding to the selected and attached one or more guide rods and one or more Z-drive belts. In some embodiments, a Z-reference detector may detect the material deposition tray when in a Z-reference position along the Z-throw. The configurable Z-axis may advantageously facilitate the production of 3D products of various Z-dimensions.

Apparatus and associated methods may relate to a configurable filament drive controller having both a cooperative and a duplicative instruction set, the duplicative instruction set providing substantially identical control signals to a plurality of filament drivers, the cooperative instruction set providing control signals to a plurality of filament drivers that are coordinated with control signals for positioning a plurality of print heads corresponding to the plurality of filament drivers. In an illustrative embodiment, two or more filament drivers may drive filaments of dissimilar materials. Each of the dissimilar materials may be deposited at different portions of a 3D product. An exemplary cooperative instruction set may direct each of the filament drivers in coordination with the position drivers to create the portions of dissimilar materials. In an exemplary embodiment, two or more copies of a 3D product may be made of the dissimilar materials provided by two or more filament drivers.

Apparatus and associated methods may relate to a print head for a 3D printer, the print head having a two-guide rod interface each having a semi-annular cylindrical guide-rod interface and a complementary semi-annular guide-rod connection aperture. In an illustrative embodiment, the semi-annular cylindrical guide-rod interface may deflect as a cylindrical guide-rod is inserted. The semi-annular cylindrical guide-rod interface may then return to its natural dimensions upon full reception of the cylindrical guide rod. In some embodiments, a polymer bushing may be located on a semi-cylindrical interface surface of the semi-annular cylindrical guide-rod interface. In an exemplary embodiment, a first guide-rod interface may receive a first guide-rod in a substantially downward facing aperture. A second guide-rod interface may receive a second guide-rod in a substantially lateral facing aperture. A drive-belt interface may be adapted to couple to an X-drive belt. Some exemplary print heads may advantageously toollessly attach to an X-carriage.

Apparatus and associated methods may relate to an extrusion head for a 3D printer, the extrusion print head having a unitary-body extrusion nozzle and a nozzle heating system, the extrusion nozzle providing a lumen with a first diameter cylindrical entry region and a transition region to a second diameter exit region, the nozzle heating system configured to provide a heat profile having a temperature less than a predetermined extrusion-material melting temperature on an entry-side of a predetermined material melting location in the first diameter cylindrical entry region and a temperature above the predetermined extrusion-material melting temperature on an exit-side of the predetermined material location. In an illustrative embodiment, the first diameter cylindrical entry region may have a diameter less than 15% larger than a cylindrical extrusion material. A compressive force may push the cylindrical extrusion material into the entry region where it warms, plasticizes and increases in diameter, which results in a piston interface between the first diameter cylindrical region and the cylindrical extrusion material. The predetermined melting location may be downstream from the piston interface which may prevent molten material from exiting the entry aperture.

Various embodiments may achieve one or more advantages. For example, some embodiments may produce a plurality of 3D products simultaneously. The production of a plurality of products simultaneously may reduce the time for creating a number of copies of a product. The use of a plurality of print heads in a cooperative fashion may facilitate 3D models having different materials in different regions. In some embodiments, changing the Z-throw dimension may permit the production of products having large and small Z-heights. Some embodiments may include configurable software having predetermined hooks for various operations. For example, some embodiments, may permit a cafeteria-style selection of X-carriage number, Z-throw dimension, extrusion control software, etc. Such cafeteria-style system selection may facilitate 3D model production using new extrusion materials, for example.

Some embodiments may improve the reliability of extrusion operation. For example, the unitary-body extrusion head may provide clean material handling. The extrusion head may remain unclogged for long periods of time. Such extrusion heads may permit operation for long periods of time, which in turn may permit the production of complicated and/or large 3D products. In some embodiment, the solid/liquid interface within the unitary-extrusion nozzle may improve the cleanliness of operation. Such an embodiment may provide for easy nozzle changes and/or cleanings.

Various embodiments may achieve one or more advantages. For example, some embodiments may present substantially low friction to resist advance of a filament disposed in the liner. Advantageously, a liner material may be used that substantially resists abrasion from the filament advancing through it. In some embodiments, the liner material may be a slippery, widely available, inexpensive, long lasting, material (e.g., PTFE) that may be chemically similar to the filament material. In some embodiments, a low resistance filament path substantially to or through the Glass Transition Zone may substantially mitigate or avoid plug formation that could disrupt filament advance and shut down or ruin 3D printing operations. Some embodiments may provide simple and rapid exchange of hot end assembly components. Various embodiments may adapt to an industry standard groove mount connector, simplifying replacement by providing a unified, complete hot end kit with a hot end assembly and integrated forced air assembly for high performance thermal management. Various implementations may further provide for simple and rapid replacement capability of the nozzle with a wrench. Various embodiments may employ a nozzle that receives a filament liner to a depth that remains below a predetermined softening or melting temperature for the liner. In some embodiments, the filament liner may be formed, at least in part, by PTFE, for example.

The details of various embodiments are set forth in the accompanying drawings and the description below. Other features and advantages will be apparent from the description and drawings, and from the claims.

BRIEF DESCRIPTION OF THE DRAWINGS

FIG. 5 depicts a perspective view of an exemplary z-axis drive assembly.

Like reference symbols in the various drawings indicate like elements.

DETAILED DESCRIPTION OF ILLUSTRATIVE EMBODIMENTS

To aid understanding, this document is organized as follows. First, an overview of functional modules of a 3D printer will be discussed, with reference to FIG. 1. Second, with reference to FIGS. 2A-3, an exemplary x-axis assembly will be described. Then, with reference to FIGS. 4A-4B, an exemplary y-axis assembly will be described. Next, an exemplary z-axis drive module will be discussed, with reference to FIG. 5. An exemplary material dispensing unit will then be described, with reference to FIG. 6. Then, with reference to FIG. 7, exemplary stackable frame units will be described. Finally, with reference to FIGS. 8-9, exemplary material extrusion modules will be described. Then the discussion turns to exemplary hot end assembly embodiments, discussed with reference to FIGS. 12-18C. FIG. 19 introduces exemplary multi-gantry system.

Figure 1:
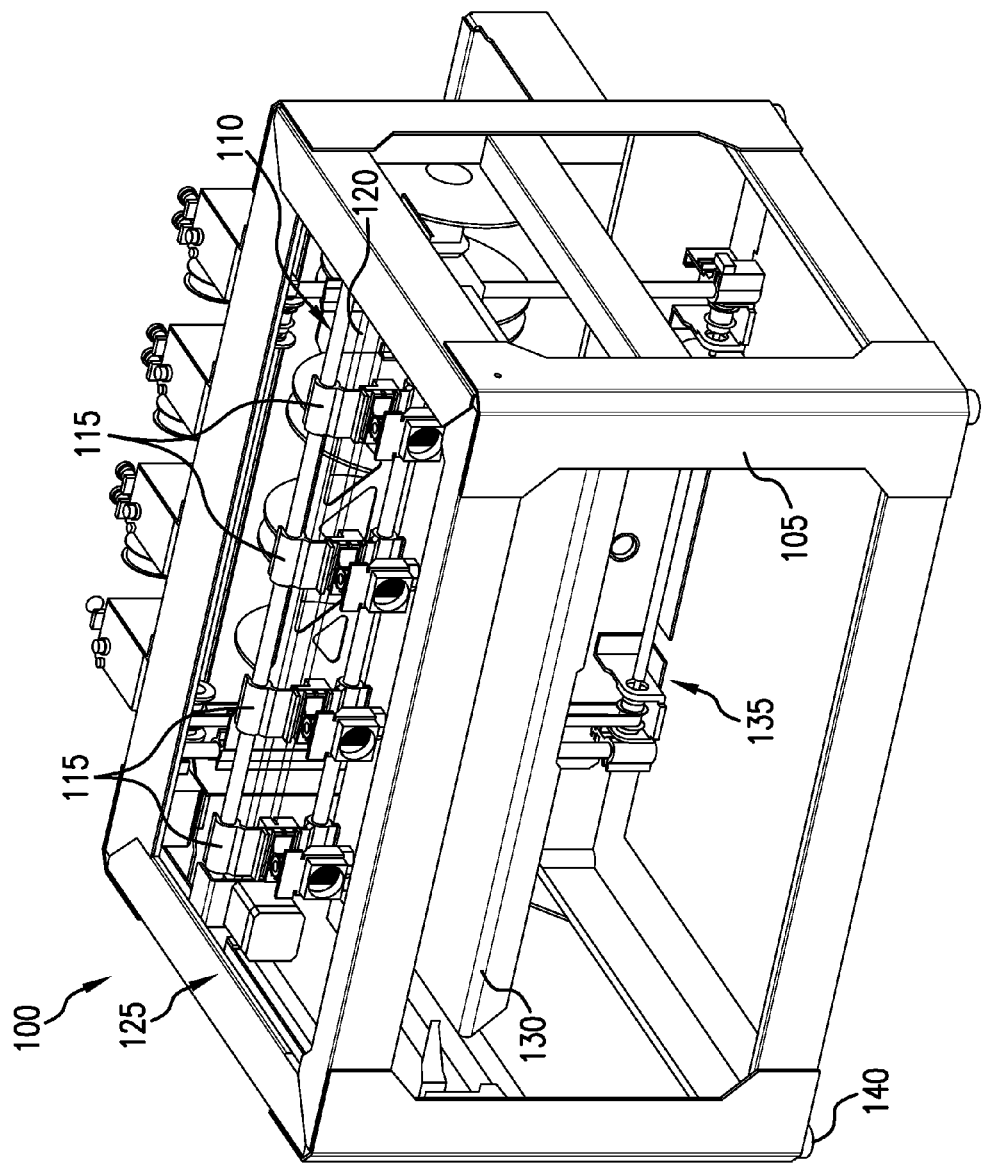
FIG. 1 depicts a perspective view of an exemplary 3D layering device.

FIG. 1 depicts a perspective view of an exemplary 3D layering device. In the exemplary embodiment, a 3D layering device 100 includes a frame 105 for securing the mechanisms that perform a 3D layering fabrication technique. In an exemplary embodiment, the 3D layering device forms 3D objects using a string-type filament. In the exemplary embodiment, the frame 105 is formed in a skeletal box-shaped configuration. As will be described later, the box-shaped configuration permits for stacking the frame to form larger sized parts or objects. In the exemplary embodiment, the frame 105 includes multiple attachment members to support the internal components.

Attached to the frame 105 is an x-axis assembly 110 having one or more print heads 115 for dispensing a filament to form one or more 3D parts or objects, where the print heads 115 move back and forth along the x-axis assembly 110 within the frame 105. The print heads 115 may be removable from the x-axis assembly 110. In an exemplary embodiment, one or more print heads 115 may be attached to the x-axis assembly 110 in a preferred spaced apart relationship. Each print head 115 may perform similar or different functions than a neighboring print head 115. For example, a first print head 115 may form a first 3D object and a second print head 115 may form a second 3D object, where the second 3D object is the substantially the same as the first 3D object. In another exemplary embodiment, first and second print heads 115 may dispense a first filament type and a second filament type of different composition, respectively. The two print heads 115 may work in a cooperative fashion in creating a 3D object using both filament materials.

In an exemplary embodiment, the print heads 115 may move from side-to-side via a motor-driven pulley 120 and/or belt system. Other mechanisms may be appreciated, such as for example one or more actuating cylinders may be employed to move the print heads 115 from side-to-side. In another exemplary embodiment, a chain and sprocket assembly may be used to move the print heads 115 from side-to-side. In some embodiments, a screw thread may be used to provide x-axis control of the print heads 115.

Also attached to the frame is a y-axis assembly 125 for moving the x-axis assembly 110 forward and backward within the interior of the frame 105. In an exemplary embodiment, the y-axis assembly 125 may move the x-axis assembly 110 forward backward via a motor-driven pulley and/or belt system. Other mechanisms may be appreciated, such as for example one or more actuating cylinders may be employed to move the x-axis assembly 110 forward and backward. In another exemplary embodiment, a chain and sprocket assembly may be used to move the x-axis assembly 110 from front to back. In some embodiments, a screw thread may be used to provide y-axis control of the x-axis assembly 110.

In an exemplary embodiment, 3D parts may be situated upon a parts tray 130 that is movable in a z-direction. The parts tray 130 may receive the deposited materials from the one or more print heads 115. When material is extruded upon the parts tray, the print heads 115 may be located above the surface of the parts tray and/or part at a predetermined distance. The vertical distance between a print head and a working surface of a parts tray and/or a part may greater than a predetermined minimum distance but less than a predetermined maximum distance. The predetermined minimum and/or maximum print head distances from the working surface may vary with different print heads and/or filament materials. Different modeling heads may be attachable to the x-axis assembly for producing 3D models using different techniques. Each modeling head may have different tolerance concerns and therefore different working distance specifications.

In various embodiments, various z-axis control of the parts tray 130 may be used. In some embodiments, the parts tray 130 may include a high friction upper surface so as to substantially prohibit unwanted movement of the 3D object thereupon when being formed. Surface texture of the parts tray 130 may promote adhesion of a first layer of deposited material, for example. In some embodiments, the parts tray 130 may include an adhesive upper surface. In another exemplary embodiment, the parts tray 130 may include a resilient upper surface, such as for example being formed of a rubber-type material. The parts tray 130 may also be temperature controllable in some exemplary embodiments. In an exemplary embodiment, the parts tray 130 is heated. Temperature control of the parts tray 130 may promote adhesion, for example.

The depicted 3D layering device may also employ a z-axis assembly 135 for moving the parts tray 130 upward and downward. In an exemplary embodiment, the parts tray 140 may move vertically along a z-axis via a motor-driven pulley and/or belt system. Other mechanisms may be appreciated, such as for example one or more actuating cylinders may be employed to move the parts tray 130 upward and downward. In another exemplary embodiment, a chain and sprocket assembly may be used to move the parts tray 130 vertically from up to down and vice versa. In some embodiments, a screw thread may be used to provide z-axis control of the parts tray 130.

The frame may also include feet 140 along a lower surface. The feet 140 raise the frame above the floor surface and may also provide a dampening effect to minimize vibration of the frame during use. The feet 140 may also increase friction between the 3D layering device and the floor surface to minimize unwanted movement of the frame. In some embodiments, the feet 140 are formed of a resilient material, such as for example rubber. In some embodiments, the feet 140 are removable, such as for example when stacking the frames. In an exemplary embodiment the feet members 135 may be adjustable to level the parts tray 130, for example.

Figure 2A:
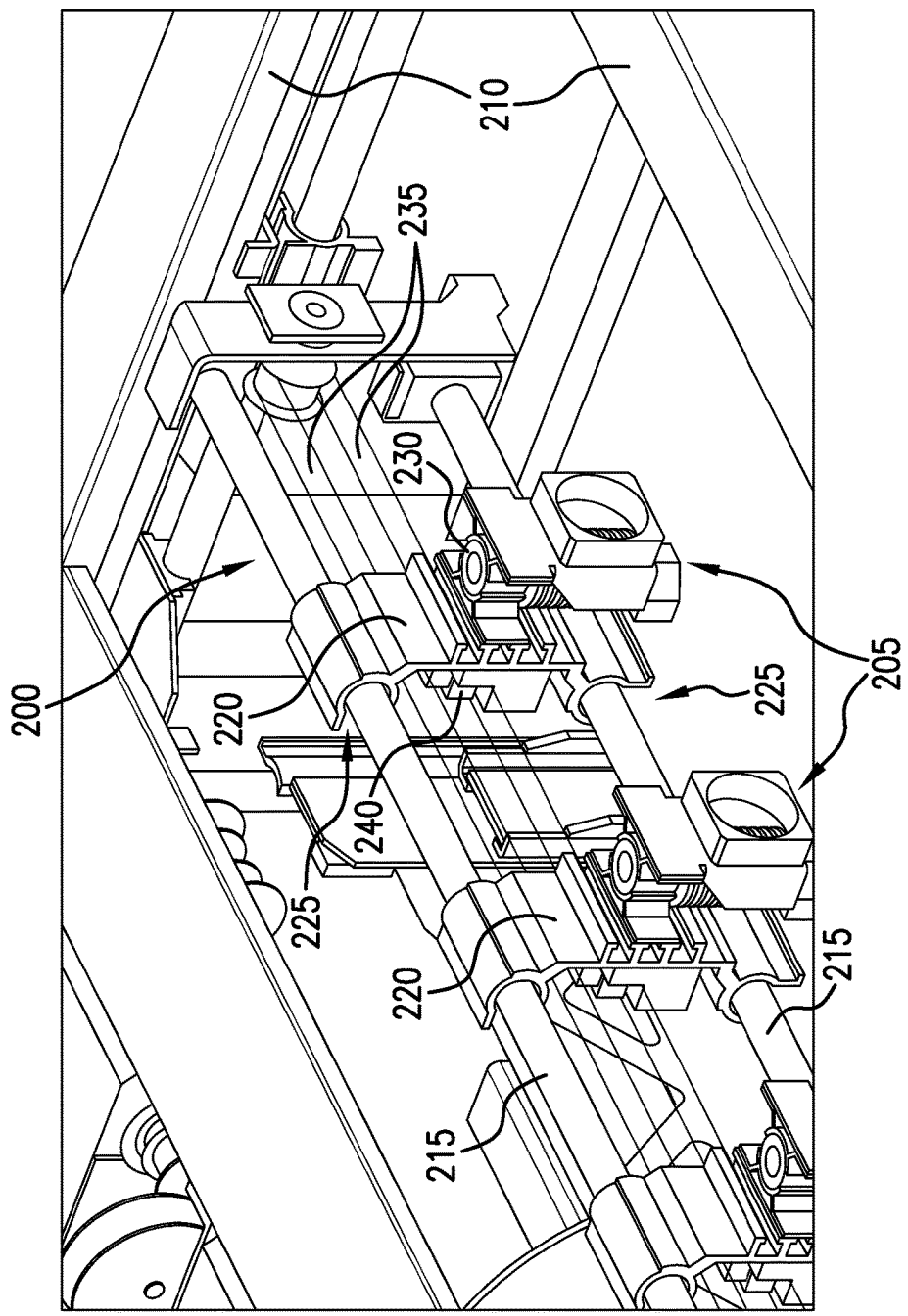
FIGS. 2A-2B depict perspective views of an exemplary x-axis assembly of the 3D layering device.
Figure 2B:
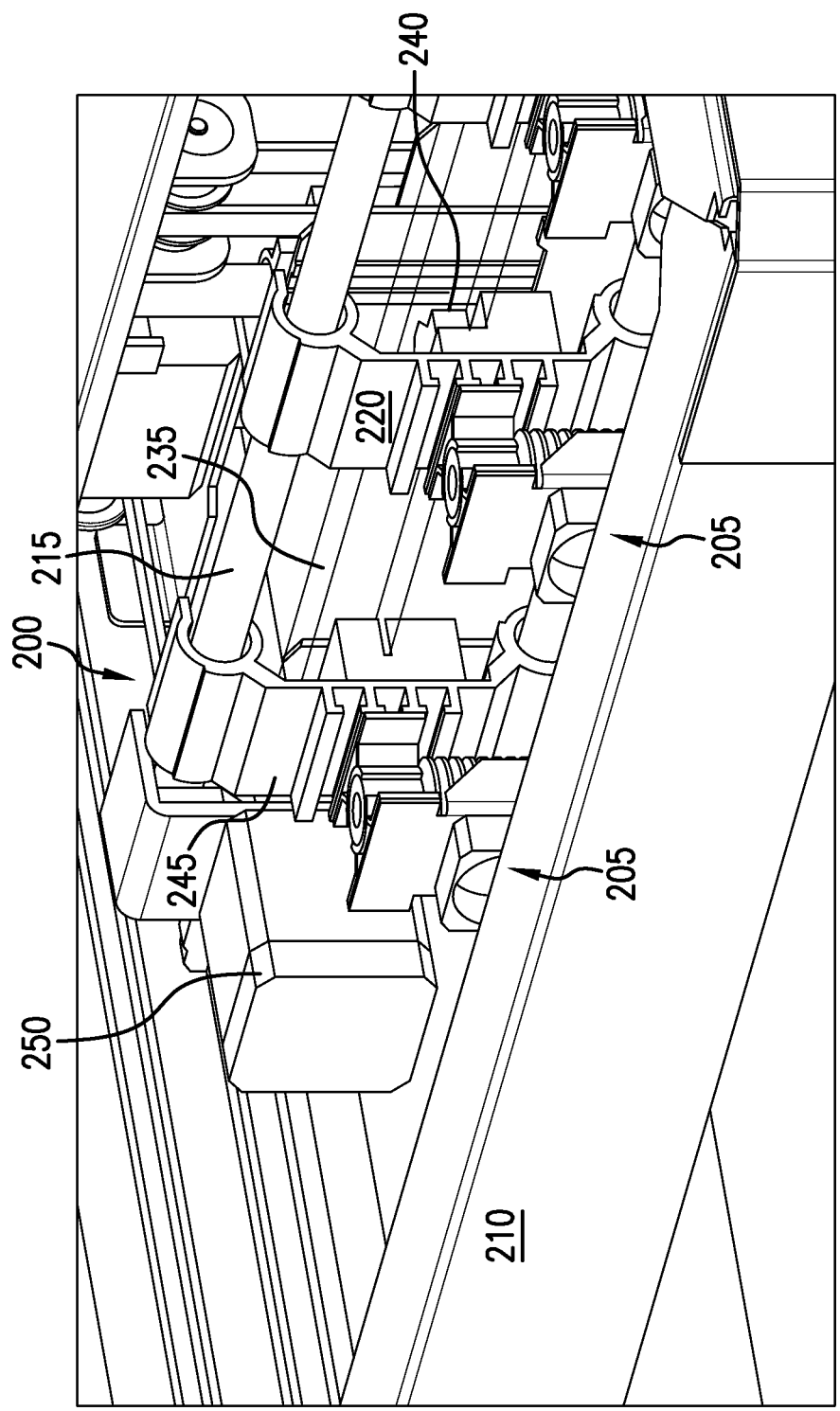

FIGS. 2A-2B depicts perspective views of an exemplary x-axis assembly of the 3D layering device. FIG. 2A depicts an exemplary x-axis assembly 200 of the 3D layering device. The x-axis assembly 200 is adapted for moving one or more print heads 205 from side-to-side along the x-axis of a frame 210. The depicted x-axis assembly 200 includes two guide rods 215 to which the print heads 205 removeably attach. The print heads 205 each have an attachment bracket 220 that has a guide-rod attachment interface 225 corresponding to each of the guide rods 215. The depicted guide-rod attachment interfaces 225 slidably couple to the guide rods 215. The guide-rod attachment interfaces 225 have a C-cross-sectional semi-cylindrical cavity to receive a cylindrical guide rod 215. The C-cross-sectional semi-cylindrical cavities may snap onto the guide rod without the use of tools, for example. For example, to attach the print head 205 to the guide rods 215, first a lower guide-rod attachment interface 225 may be pushed in a downward direction and snapped onto a lower guide rod 215. Then an upper guide-rod attachment interface 225 may be pushed laterally and snapped onto the upper guide rod 215. On the inside surface of the C-cross-sectional semi-cylindrical cavity may be a bushing. The bushing may reduce the friction when the print head 205 is slid along the guide rods 215, for example.

Each attachment bracket 210 may support an extrusion head 230. The attachment bracket 210 supports the extrusion head 230 in a predetermined orientation, such as for example vertically, and also supports the print head 205 about an x-carriage of the x-axis assembly. The print heads 205 are adapted to slide back and forth along guide rods 215. In an exemplary embodiment, the x-guide rods are hollow to reduce an overall weight of the 3D layering device. The print heads 205 are driven along the guide rods by a drive belt 235.

The drive belt can be removably attached to the print head 205. The print head has a drive-belt attachment member 240 that can be coupled to the drive belt 235. In some embodiments, a user may attach the drive-belt attachment member 240 to the drive belt without using tools. In an exemplary embodiment, the drive-belt attachment member 240 may couple to a toothed drive belt 235 at various discrete locations. The drive-belt attachment member 240 may, for example, capture one or more teeth of the drive belt 235 within complementary features in the drive-belt attachment member 240. In this way, a separation distance between adjacent print heads 205 may be at an integer number of a tooth pitch distance from one another. In an exemplary embodiment, the print heads 205 may have a predetermined width that is substantially equal to an integral number of drive-belt pitches in distance. Thus, two print heads 205 may be juxtaposed immediately adjacent to one another, each attached to the drive belt 235. The separation distance between the two adjacent print heads 205 may thus be controlled to a predetermined separation distance.

FIG. 2B depicts the exemplary x-axis assembly 200 of the 3D layering device from an alternate perspective. The drive belt 235 is driven by a drive pulley 245. The drive pulley 245 is powered by a drive motor 250. In some embodiments, the x-axis driver may have a position detection system. Some position detection systems may have an optically encoded position indicator, for example. In some embodiments, magnetic sensors may detect the location by sensing magnets spaced along an x-carriage assembly.

Figure 3:
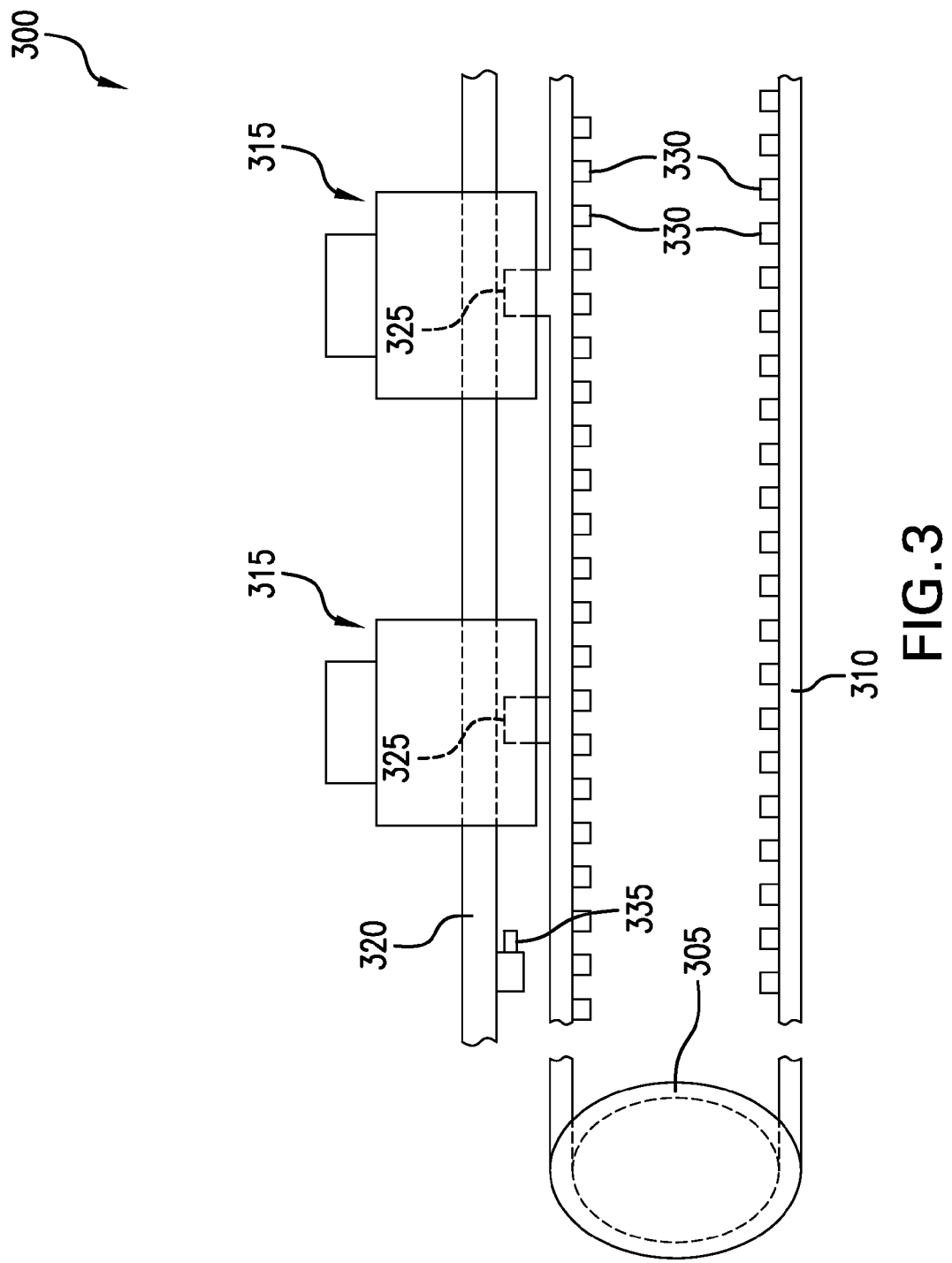
FIG. 3 depicts a schematic view of an exemplary x-carriage assembly.

FIG. 3 depicts a schematic view of an exemplary x-carriage assembly 300. In the exemplary embodiment, the x-carriage assembly 300 includes a pulley 305 and drive belt 310 to move two print heads 315 from side-to-side along one or more x-guide rods 320. As shown, the drive belt 310 includes a plurality of spaced-apart engagement teeth 325 for engaging a respective print head 315. The engagement teeth 325 are illustrated as being embedded within an aperture of the print head 315 in the exemplary embodiment. In other exemplary embodiments, the engagement teeth 325 may be clamped to the respective print head. In other exemplary embodiments, the engagement teeth 325 may automatically engage and lock to the print head 315 upon circulation of the belt. In some embodiments the engagement teeth 325 may be on an exterior surface of the drive belt 310. In some embodiments, the print heads 315 may couple to the drive belt using drive teeth 330 on an interior side of the drive belt 310.

In an exemplary embodiment, the print heads 315 are attached to the x-guide rod 320 in any spaced-apart relationship. When the drive belt 310 begins to circulate, the engagement teeth 325 cause the print heads 315 to be spaced apart in a direct relationship to the engagement teeth 325. If the engagement teeth have a tooth pitch of 4 inches, then the print heads may be spaced apart at 4 inches, 8 inches, 12 inches, etc. If, for example, the print heads 315 are coupled to the drive belt 310 using the drive teeth 330 whose pitch is ¼ inch, neighboring print heads may be ½ inch, ¾ inch, 1 inch, etc. apart. In some embodiments, print head 215 attachment locations may be detected by detection elements in the drive belt 310. For example, each engagement tooth 325 may have a hall sensor to detect a magnet in an attachment member of the print head 315.

Also depicted in FIG. 3 is an x-sensor 335 to detect and set an end-point location a print head 315 located nearest the x-sensor 335. For example, the drive belt 310 may initially move the print heads 315 along the x-guide rod 320 until an outermost print head 315 is detected by the x-sensor 335. Once the print head 315 is detected, a controller in communication with the x-sensor is made aware of a position of the print head 315. The position of the print head 315 may be deemed a reference position of the print head 315 for a sequence of operations to form the 3D object. Thus, the print heads 315 may be initially attached at any position along the x-guide rod 320 through engagement of the print heads 315 with the engagement teeth 325. Detection of the print heads by the x-sensor 335 may be used to determine a maximum lateral position of the x-carriage assembly 300. A similar x-sensor positioned on an opposite side of the x-carriage assembly 300 may be used to set the other extreme position of the x-carriage assembly. The controller may then determine the maximum x-range of the x-carriage assembly 300 using the two detected extremes.

In an exemplary embodiment, the x-sensor 335 may be configured as a switch. For example, the x-sensor 335 may be a micro-switch having touch activation. As the print head 315 comes in physical contact with the micro-switch, a signal may be sent to the controller for example. In an exemplary embodiment, a controller that is onboard the frame may send executable instructions to form the intended 3D object. In another exemplary embodiment, a controller may be remote from the 3D layering device and the x-sensor 335 which may communicate wirelessly with the controller.

Figure 4A:
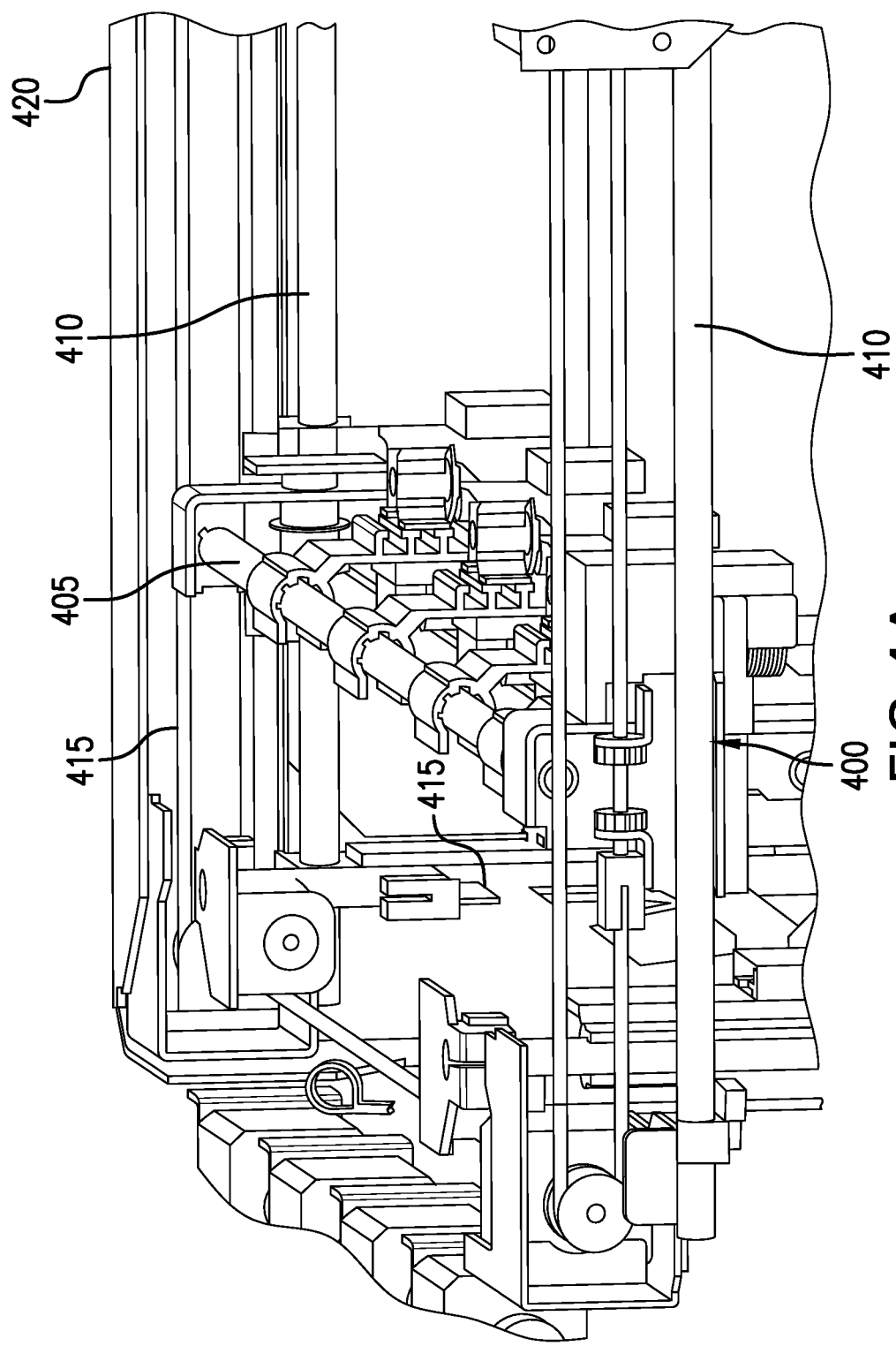
FIG. 4A depicts a perspective view of an exemplary y-axis assembly.

FIG. 4A depicts a perspective view of an exemplary y-axis assembly 400. The depicted y-axis assembly 400 couples to one or more x-carriage assemblies 405 and includes a y-guide rod 410 and a motor-driven pulley 415 for driving the x-carriage assembly 405 forward and backward within the frame 420. In an exemplary embodiment, the y-guide rod 410 may be hollow to reduce an overall weight of the 3D layering device. In an exemplary operational instance, when the x-carriage assemblies 405 is at a forwardmost position, a feature on the x-carriage assembly may be detected by a y-axis limit sensor. Similarly a y-axis limit sensor may detect a rearmost position of the x-axis assembly 405. In some embodiments, pulleys 415 and/or y-guide rods 410 may be located on opposite sides of the x-carriage assembly 405. Both of the opposite side pulleys 415 may be actively driven in a substantially identical manner, for example. In such a system, the x-carriage assembly 405 may be actively positions in a y-direction for both of opposite sides of the x-carriage assembly 405. In some embodiments, more than one x-carriage assembly 405 may attach to the y-guide rods 410 and/or pulleys 415. Such multiple x-carriage assemblies 405 may increase the number of 3d products that can be simultaneously produced, for example.

Figure 4B:
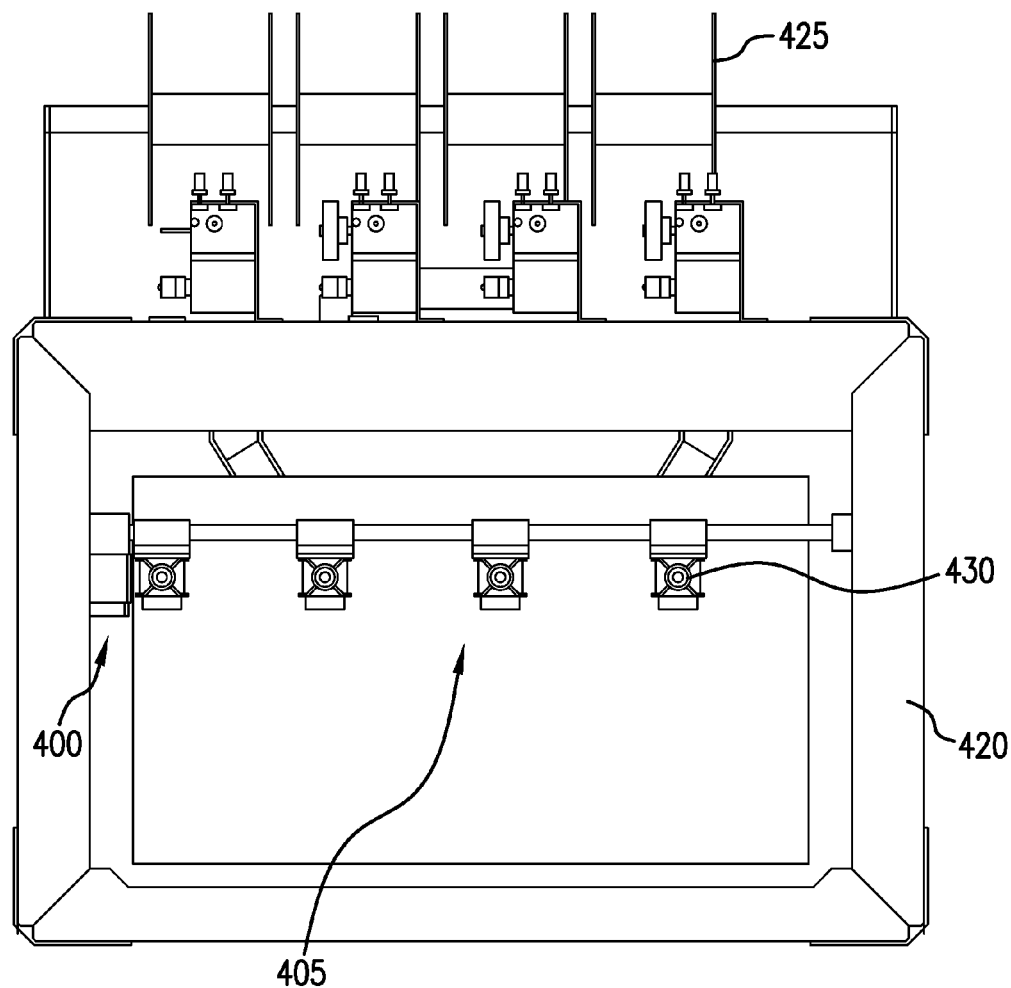
FIG. 4B depicts a plan view of an exemplary 3D layering device.

FIG. 4B depicts a plan view of an exemplary 3D layering device. As depicted, the 3D layering device includes a y-axis assembly 400 for moving the x-axis assembly 405 forward and backward along a y-axis with respect to the frame 420. In an exemplary embodiment, the entire x-axis assembly 405 is able to slide forward and backward by the y-axis assembly 400. The y-axis assembly 400 may include a pulley and belt assembly connected to the x-axis assembly 405. Also depicted in FIG. 4B is a plurality of spools 425 for holding filament used in fabricating the 3D objects. In an exemplary embodiment, multiple spools 425 are spaced parallel with the x-axis of the frame such that at least one spool 425 aligns with each of four depicted print heads 430 of the x-axis assembly 405. As such, each print head 430 may receive filament wound around an aligning spool 425.

FIG. 5 depicts a perspective view of an exemplary z-axis drive assembly 500. The depicted 3D printing device 500 includes a z-drive assembly 505. The z-drive assembly 505 controls a vertical positioning of a parts tray 510. The z-drive assembly includes a drive motor 515 and a drive shaft 520. The drive shaft 520 has one or more drive pulleys 525. One or more of the one or more drive pulleys 525 is coupled to a drive belt 530. The drive belt may be coupled to the parts tray 510. The parts tray 510 may slidably couple to one or more z-axis guide rods 535. In some embodiments, the use of 1, 2, 3, 4, or more drive belts 530 and/or z-axis guide rods 535 may be used to control z-axis positioning of the parts tray 510. Use of multiple drive belts 530 and/or guide rods 535 may improve a leveling of the parts tray 510, for example.

The depicted 3D printing device 500 also has four filament drivers 540 and four filament spools 545. Extrusion materials may be spooled onto one or more of the filament spools 545. The extrusion materials from one or more of the filament spools may then be threaded through corresponding filament drivers 540. Each of the filament drivers 540 may provide a driving force to the attached filament. A filament may then be threaded through a flexible cable housing to one of a plurality of print heads 550. The flexible cable housing (not depicted) may be sized to have an inside diameter slightly greater than a diameter of the filament threaded therethrough. The driving force impressed upon each filament by the corresponding filament driver 540 may then be transferred to a force that extrudes the liquefied filament material from an extrusion nozzle (not depicted) in the print head 550. This filament drive mechanisms may be facilitated by a proper selection of a cable housing with respect to a filament diameter.

Figure 6:
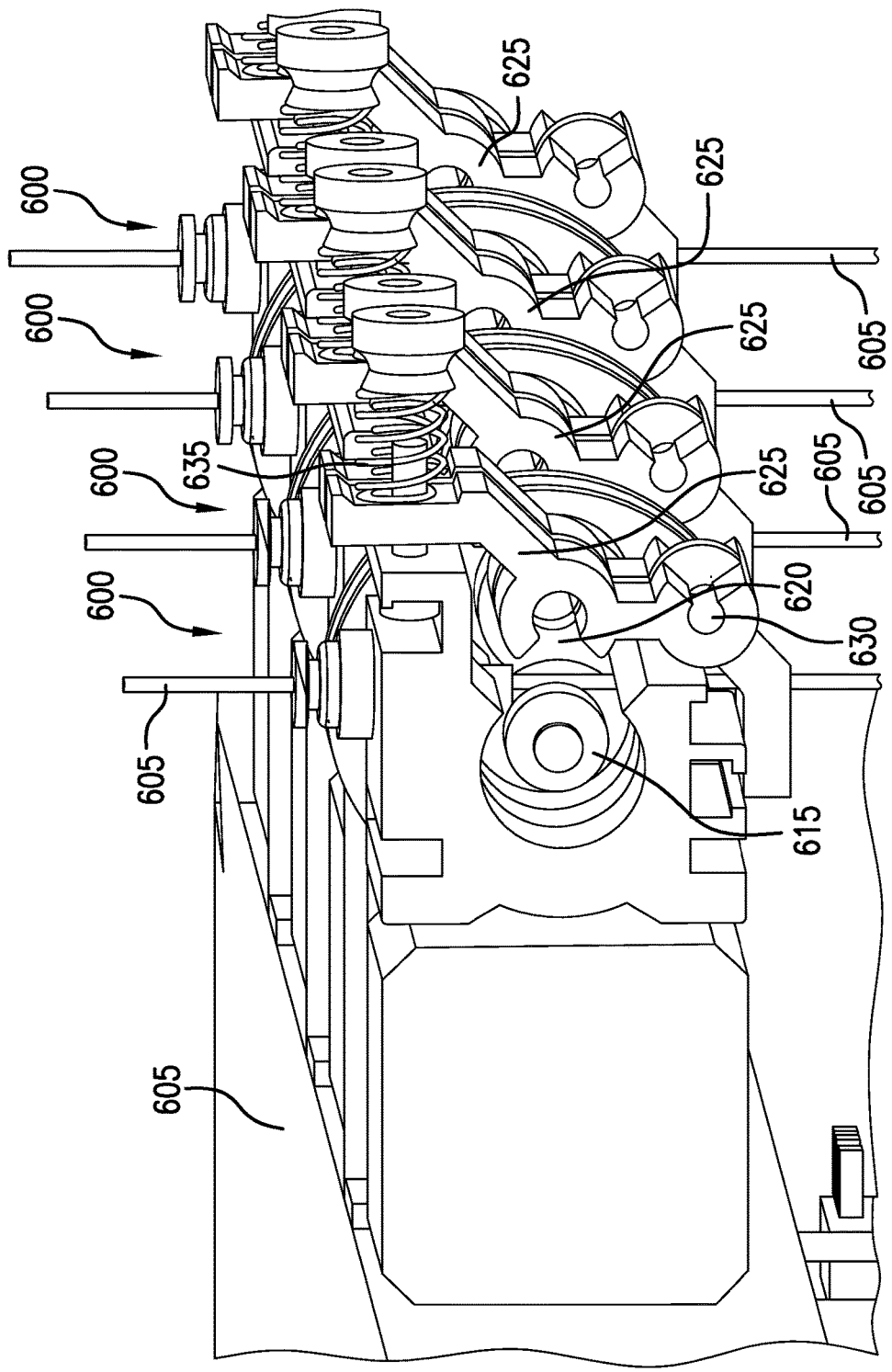
FIG. 6 depicts a perspective view exemplary material filament drivers.

FIG. 6 is a perspective view of exemplary filament drivers of an exemplary 3D printer. In FIG. 6, four exemplary filament drivers 600 are distributed along a printer frame 605. A filament 610 is depicted as being threaded through each of the four filament drivers 600. The filament 610 is threaded between a drive wheel 615 and an idler wheel 620 (both depicted semi-transparently). The drive wheel 615 may have a textured surface that contacts the filament 600 to provide friction. The idler wheel 620 may present an adjustable force between the idler wheel 620 and the drive wheel 615. In the depicted embodiment, the idler wheel 620 is rotatably coupled to a lever 625. The lever 625 is pivotably coupled to a shaft (not depicted) at a fulcrum point 630. A spring force can be adjusted by compressing a spring 635 at an effort end of the lever 625. Each of the filament drivers 600 may be controlled by a filament drive controller. The filament drive controller may control rotational position of the drive wheel 615, for example of the filament driver 600. In this way, the filament may be propelled through a cable housing to a print head, for example.

Figure 7:
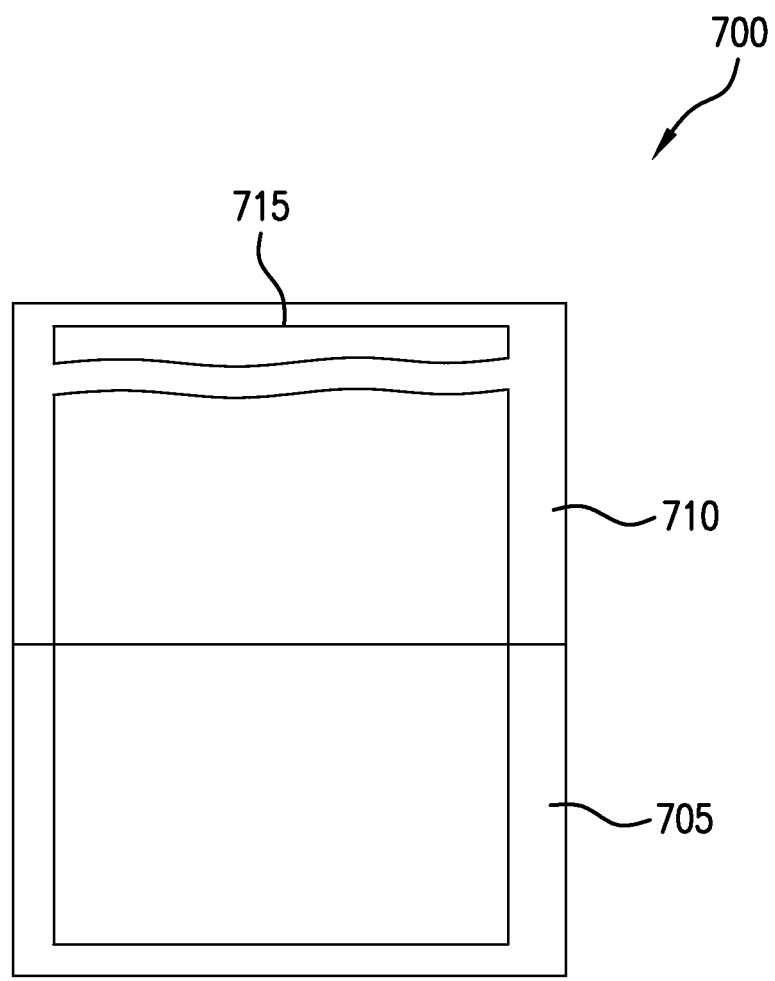
FIG. 7 depicts a schematic view of exemplary stacked frame units.

FIG. 7 depicts a schematic view of exemplary stacked frame units. In the exemplary embodiment, a 3D layering device 700 may include multiple frames 705, 710 may stacked on top of each other in a modular manner. The embodiment illustrates two stacked frames 705, 710, however some exemplary embodiments may include three, four, five, or more frames in a stacked manner. Also illustrated is a modular top unit 715 mounted above a top frame 710. Modular units may perform one or more functions. For example a top unit may include a fume hood, for example.

In the exemplary embodiment, the first frame 710 may include many components for forming 3D parts as described herein. The second frame may consist of a relatively few components, such as for example z-axis components. A standard z-axis control assembly may be removed from the first frame 710 and an elongated z-axis control assembly may replace it. The elongated z-axis control assembly may extend from the first frame 710 to the bottom of the second frame 715. The a-axis control assembly may be able to thus move the tray (not shown) a greater vertical distance thereby permitting the 3D layering device to fabricate larger parts.

In some exemplary embodiments, alteration of an x-carriage assembly may be facilitated by using multiple frames stacked side-to-side to form objects of a greater width. In other exemplary embodiments, alteration of the y-carriage assembly may be facilitated by using multiple frames to be stacked front-to-back to form objects of a greater depth. In other exemplary embodiments, multiple frames may be stacked vertically and horizontally.

Figure 8:
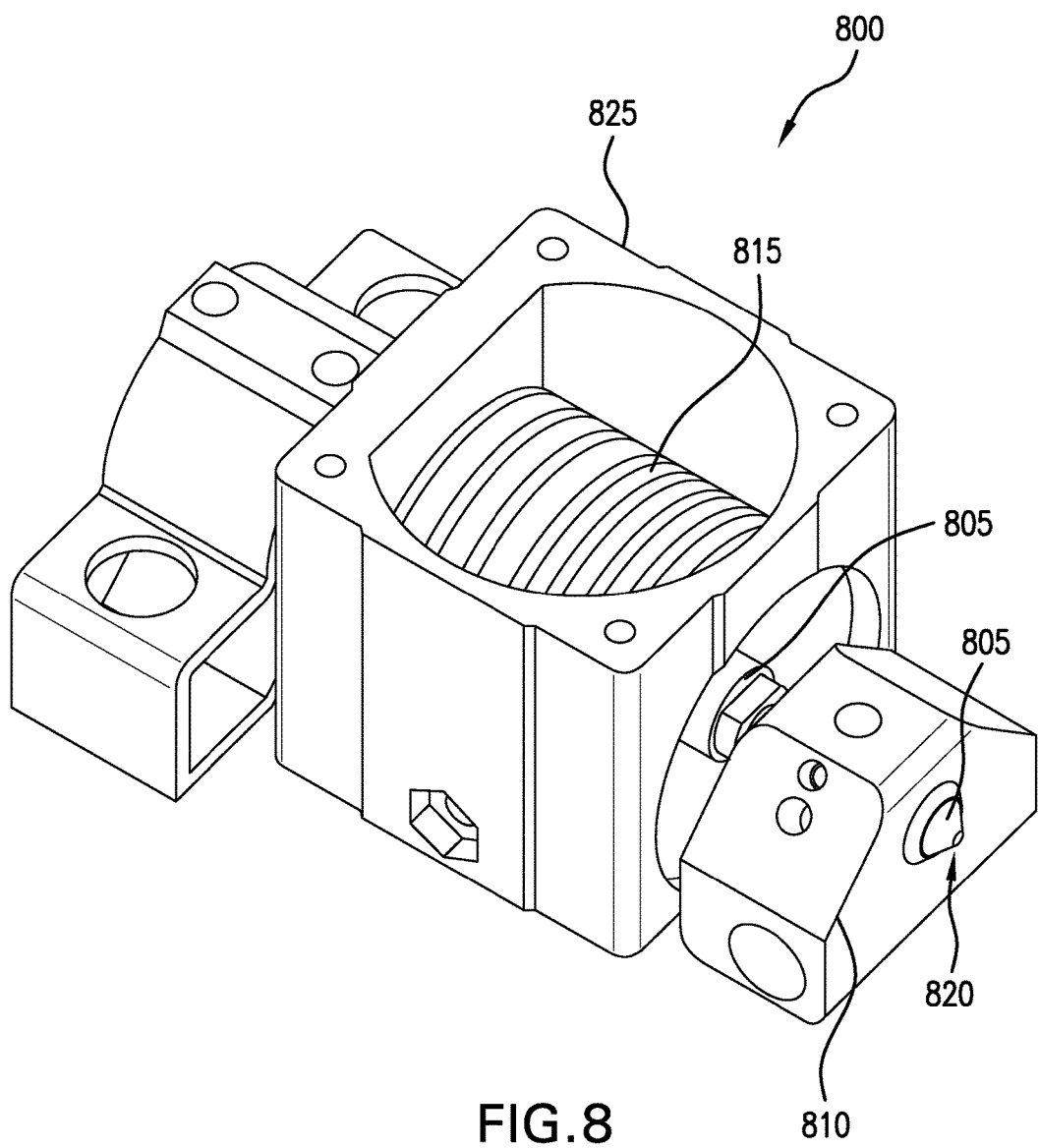
FIG. 8 depicts a perspective view of an exemplary extrusion module.

FIG. 8 depicts an exemplary extrusion head 800. The depicted extrusion head 800 includes an injection nozzle 805, a heater 810, and a cooling member 815. The injection nozzle 815 has an extrusion aperture 820 from which 3D modeling material may be extruded. A fan (not depicted) may be mounted to a cooling housing 825 to provide increased airflow to the cooling member 815. A temperature profile of the extrusion nozzle 805 may be controlled by the heater 810. The temperature profile of the extrusion nozzle 805 may be controlled by the cooling member 810 as well. The temperature of a filament entry end of the extrusion nozzle 805 may be less than a predetermined filament melting point. The temperature of an extrusion end of the extrusion nozzle 805 may be greater than a predetermined melting point of an extrusion material.

Figure 9:
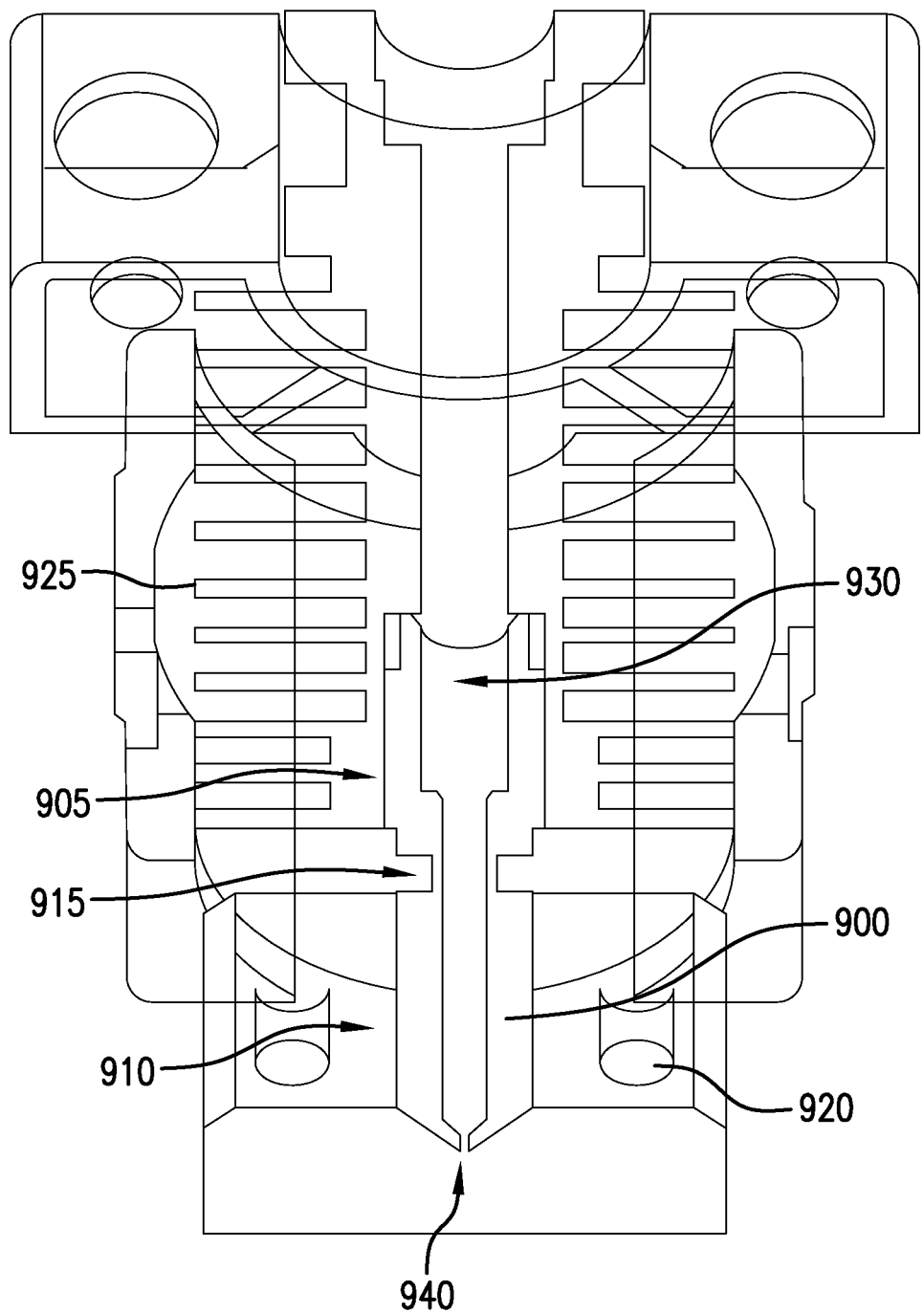
FIG. 9 depicts a cross-sectional view of an exemplary injection nozzle.

FIG. 9 depicts a cross-sectional view of an exemplary injection nozzle 900. As depicted in FIG. 9, the injection nozzle 900 has a filament entry end 905 and an extrusion end 910 connected by a necked down region 915. The extrusion end 910 is coupled to a heater 920. The filament entry end 905 is coupled to a heat sink 925. The filament entry end 905 has a cylindrical cavity 930 having a diameter that is slightly oversized that an outer diameter of a cylindrical filament. A temperature gradient along a longitudinal length of the injection nozzle 900 may result from the arrangement of the heater 920 and the heat sing 925. For example, the extrusion end 910 of the injection nozzle 900 may be at a temperature above a melting temperature of an extrusion material. But a point where a filament enters the injection nozzle 900, the temperature may be below the melting temperature of the extrusion material. The extrusion material may plastically deform as it heats up to near the melting temperature. The outer diameter of the filament may expand as the filament plastically deforms, which may result in the outer diameter of the filament engaging an inner surface of the filament entry end. This engagement may result in a piston like sealing of the filament and the inner surface of the filament entry end. Then, closer to the extrusion end, but still in the region where the diameter of the cylindrical cavity is slightly larger than the un-melted filament, the filament may be heated above the melting temperature causing the filament to melt. The sealing interface may prevent the melted material from back-flowing out of the filament entry end 905. The melted material may be forced out of an extrusion aperture 940 in the extrusion end 910.

Figure 10:
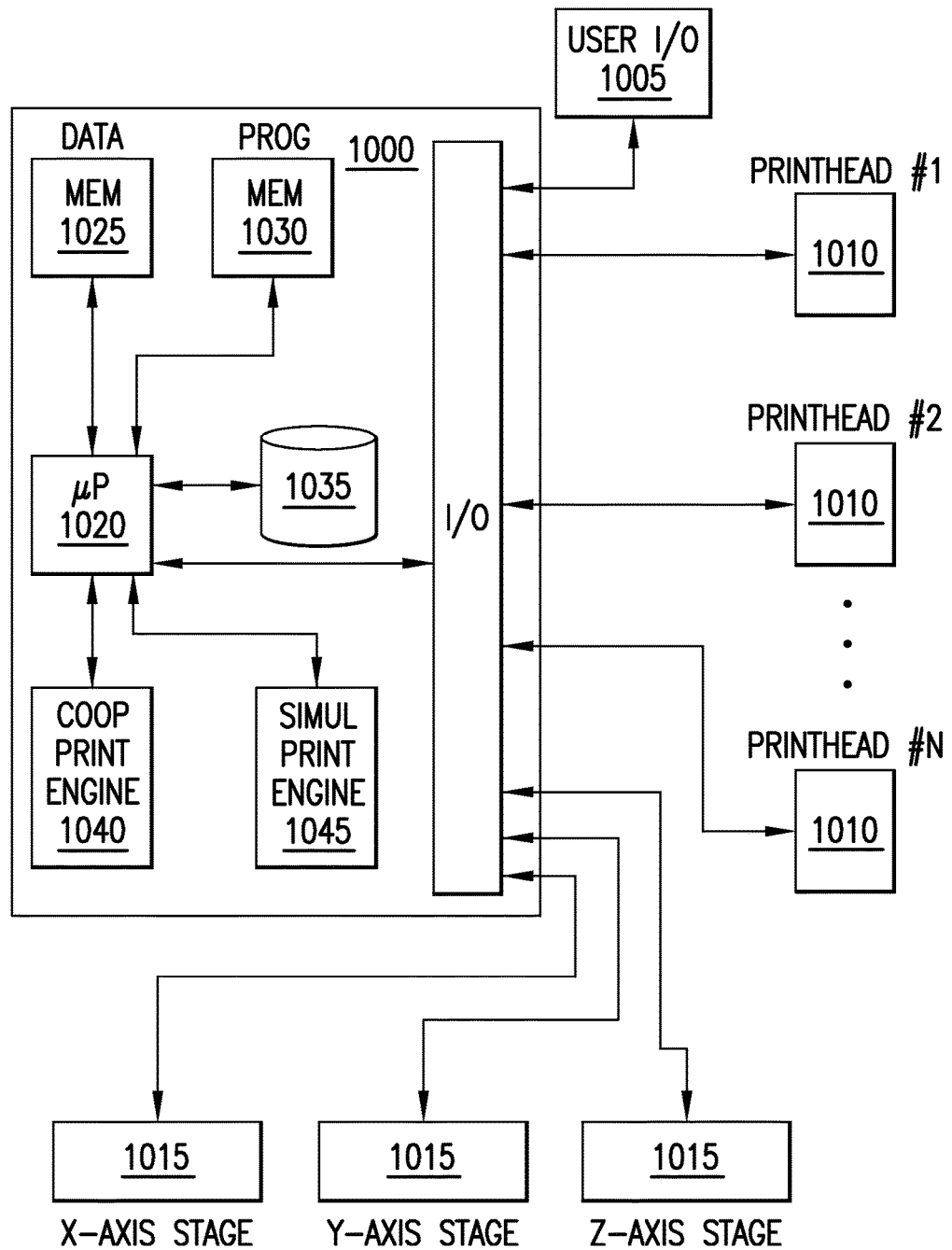
FIG. 10 depicts a block diagram of an exemplary module 3D printing system.

FIG. 10 depicts a block diagram of an exemplary module 3D printing system. In FIG. 10, an exemplary 3D resource controller 1000 is in communication with a user input/output module 1005. A user may input control information to the 3D resource controller 1000 using the user input/output module 1005. The 3D resource controller 1000 may send display information to the user input/output module 1005. The 3D resource controller 1000 is in communication with a plurality of print heads 1010. The 3D resource controller 1000 is also in communication with a plurality of stage controllers 1015. The stage controllers 1015 may control the relative positioning of a parts tray to each of the print heads 1010.

The 3D resource controller 1000 includes a microprocessor 1020. The microprocessor 1020 is coupled to data memory 1025. Program memory 1030 is also coupled to the microprocessor 1020. The microprocessor may store and retrieve information from a storage unit 1035. The microprocessor may send 3D print control information to a cooperative print engine 1040. The cooperative print engine 1040 may coordinate 3D print control of multiple print heads 1010. The microprocessor may send 3D print control information to a simultaneous control engine 1045. The simultaneous control engine 1045 may produce resource control signals that, when sent to multiple print heads 1010 facilitate each of the print heads 1010 to produce substantially identical copies of a 3D product.

Figure 11:
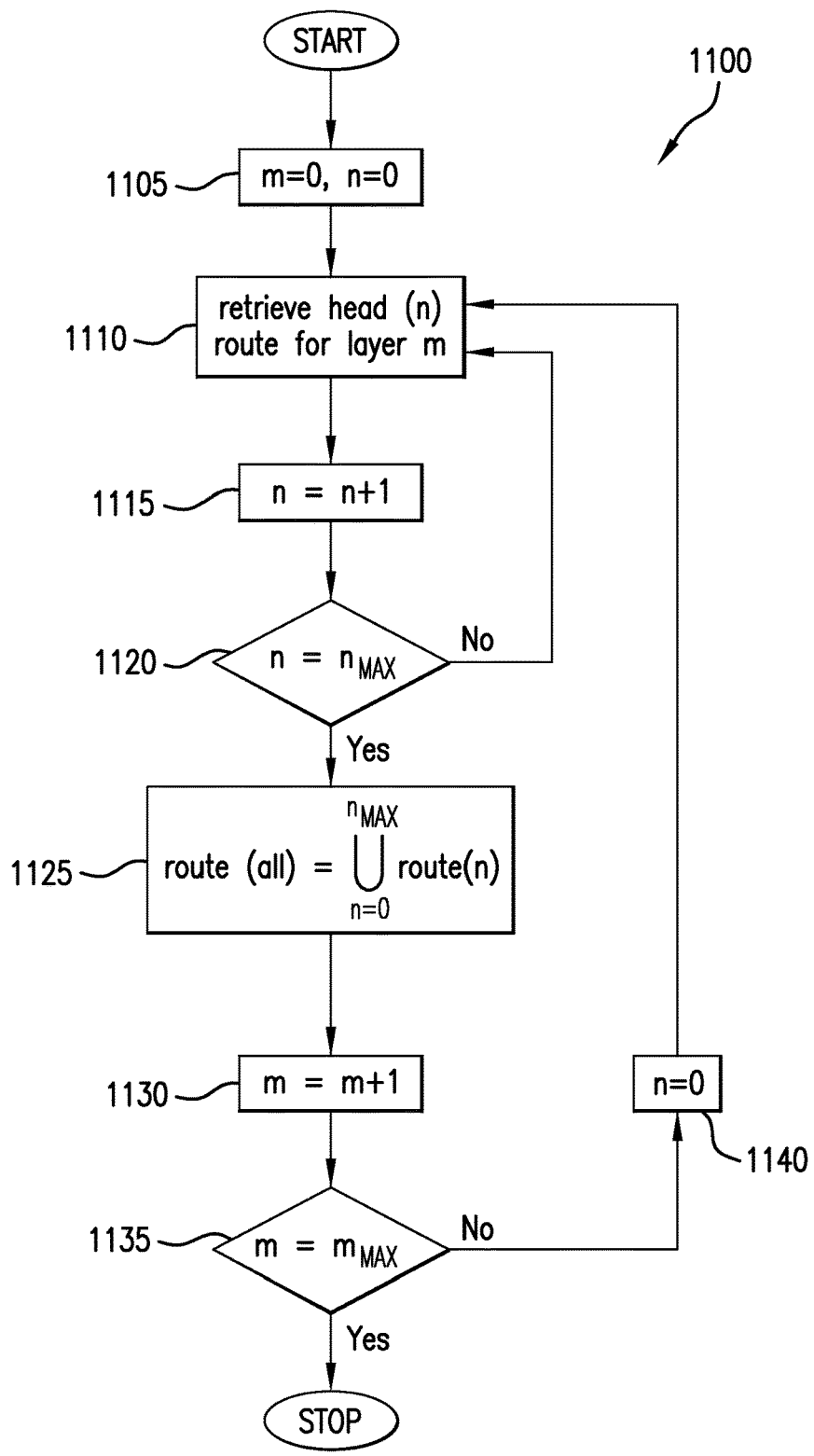
FIG. 11 depicts a flow chart of an exemplary method of coordinating 3D printer resources when using multiple print heads.

FIG. 11 depicts a flow chart of an exemplary method of coordinating 3D printer resources when using multiple print heads. In FIG. 11, an exemplary method 1100 of merging the operations of producing multiple 3D products is given from the perspective of the microprocessor 1020 depicted in FIG. 10. The method 1100 begins by the microprocessor 1020 initializing a print head counter, N, and a layer counter, M 1105. Then the microprocessor 1020 retrieves the $N^{th}$ print head's operations associated with the $M^{th}$ layer 1110. Next, the microprocessor increments the print head counter, N 1115. The microprocessor then tests if the $N^{th}$ print head counter is being used 1120. If the $N^{th}$ print head is being used, the method returns to step 1110 and retrieves the $N^{th}$ print head's operations for this layer. If the $N^{th}$ print head is not being used, the microprocessor 1020 merges all of the $M^{th}$ layers control operations 1125. For example, the merged travel operations may be the union of the travel operations of all of the used print heads. Then the processor increments the layer counter, M 1030. The microprocessor then tests to see if the $M^{th}$ layer is used 1135. If so, the processor initializes the print head counter, N 1140, and then returns to step 1110. If not, the method ends.

Figure 12:
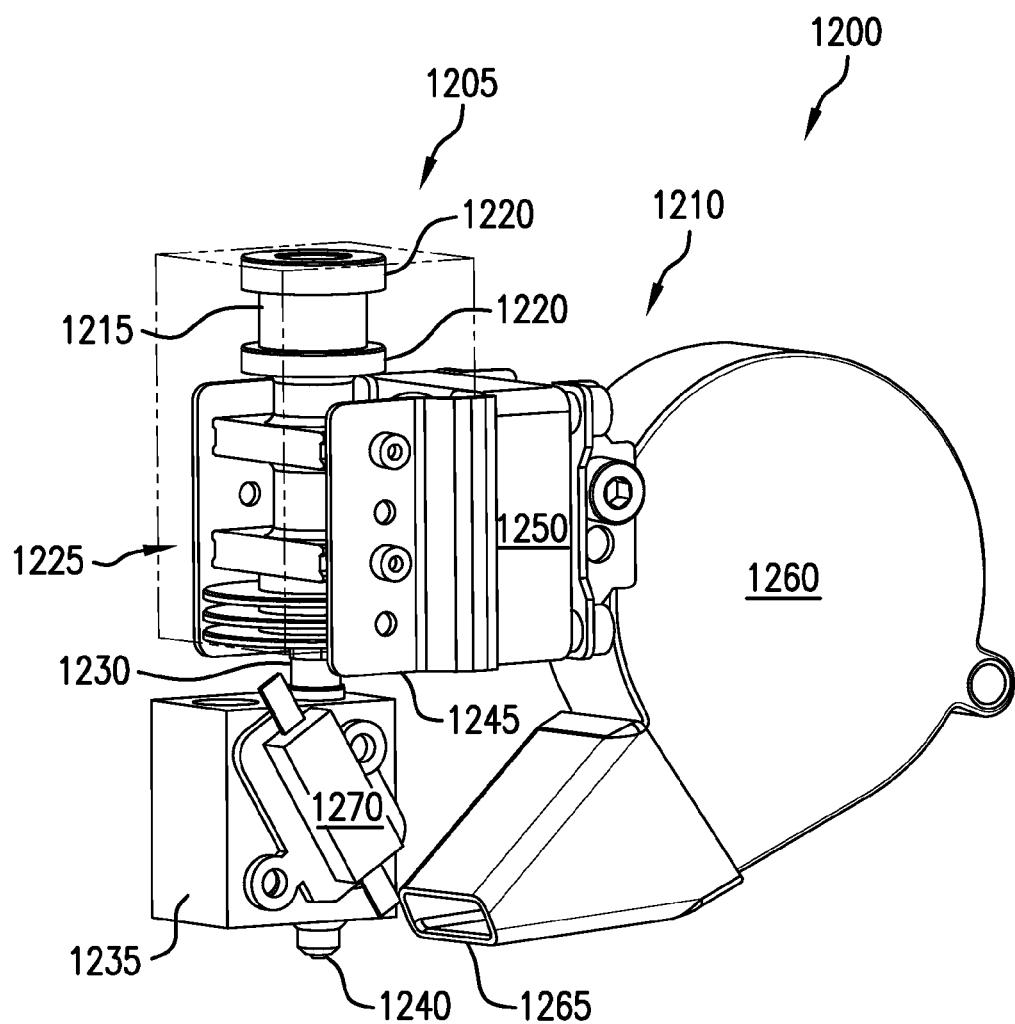
FIG. 12 depicts a perspective view of an exemplary hot end assembly kit.

FIG. 12 depicts a perspective view of an exemplary hot end assembly kit. In the depicted figure, a hot end assembly kit 1200 includes a hot end assembly 1205 integrated with a forced cooling assembly 1210. The kit 1200 may provide a complete replacement module for a 3D printer configured with a groove mount for its hot end. In the depicted kit 1200, the hot end assembly 1205 provides a coupling throat 1215 to be readily captured in a groove mount system to be received between shoulders 1220 to support the entire kit 1200. In various embodiments, the hot end assembly kit 1200 may provide a complete solution package for replacing an existing hot end assembly on a 3D printer having a groove mount to capture the coupling throat 1215. In various implementations, the entire hot end assembly of any compatible 3D printer can be replaced in a matter of minutes, with complete thermal management including forced cooling integrated into the kit.

The hot end assembly 1205 includes a heat sink assembly 1225, a nozzle shaft 1230, a heater block assembly 1235, and a nozzle tip 1240. In operation, an elongate solid filament material suitable for deposition may be fed (e.g., from a spool) through a lumen defining a vertical filament path through the hot end assembly 1205 from an aperture in the coupling throat 1215 through an aperture in the nozzle tip 1240. The hot end assembly 1205 guides the filament, melts it, and deposits it in small quanta of ejected material at a location determined by the location of the nozzle tip 1240.

Attached to the heat sink assembly 1225 is a heat sink shield 1245. During operation, the heat sink shield may advantageously help to block a user's fingers from inadvertently touching the highest temperature portions of the heat sink assembly 1225. In addition, the heat sink shield 1245 supports the forced cooling assembly 1210.

The forced cooling assembly 1210 includes a heat sink fan 1250 that may axially blow ambient air between the heat sink shield 1245 plates and around the heat sink assembly 1225. The forced cooling assembly 1210 further includes a dryer 1260 having a dryer nozzle 1265. The dryer 1260 may direct air flow across the deposited materials that have exited through the nozzle 1240, to promote rapid curing and hardening of deposited materials.

The integrated kit 1200 may provide a fully equipped, ready to use hot end with forced air to promote thermal management so that the 3D printer maintains its components within designed temperature boundaries. In the depicted example, the kit 1200 further includes a temperature protection module 1270 to provide additional protection in the event of a thermal runaway condition, or over temperature event. In some examples, the temperature protection module may comprise a thermal fuse, positive temperature coefficient resistor (PTC), thermal cut-off (TCO), or similar device configured to interrupt the oversupply of heat to the heater block assembly 1235.

Figure 13A:
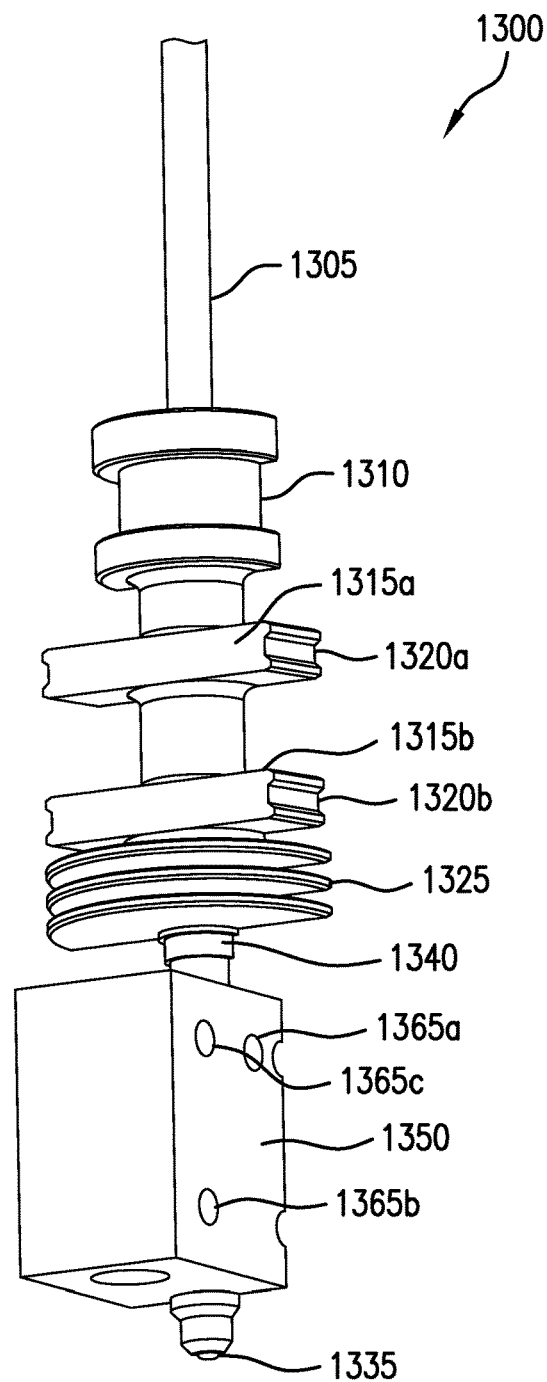
FIGS. 13A-13B depict front and back perspective cross section views of an exemplary filament path of a hot end assembly kit.
Figure 13B:
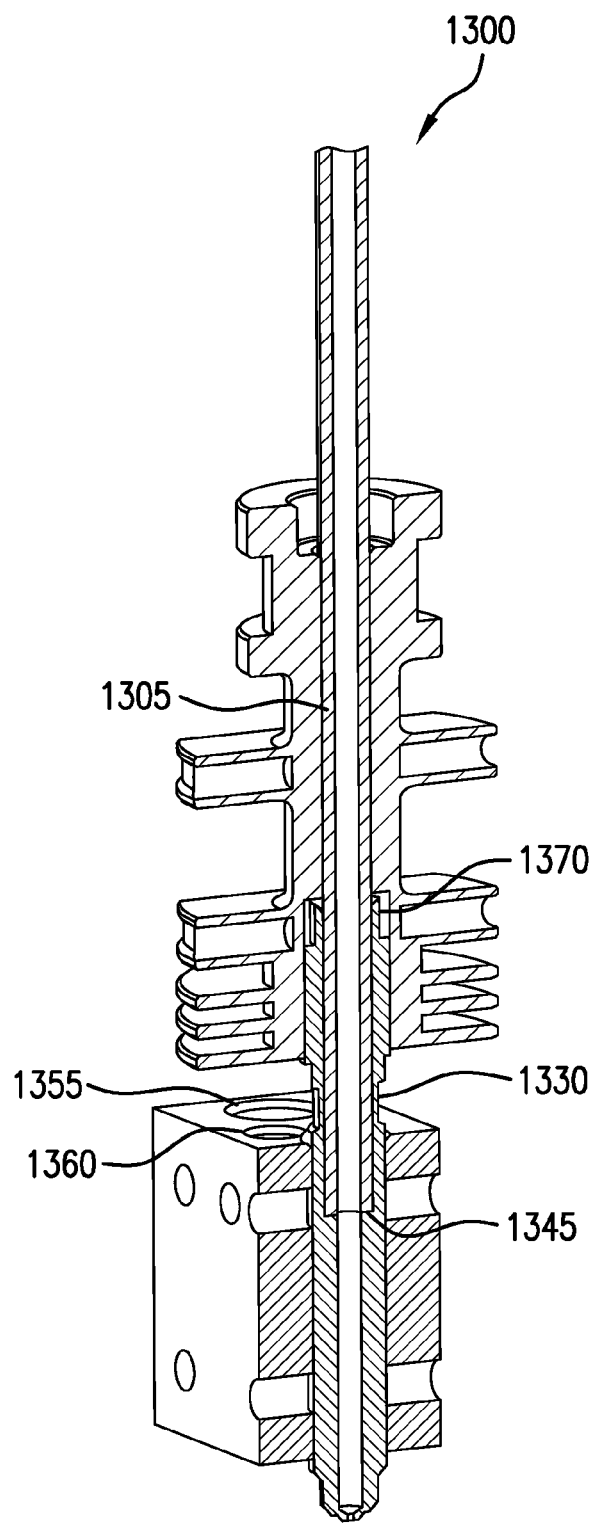

FIG. 13A-13B depict front and back perspective cross section views of an exemplary filament path of a hot end assembly kit. In various embodiments, the filament path may advantageously provide low abrasion and low friction liner for feeding the filament into the glass transition zone of the filament path. Such reduced filament path friction may, for example, advantageously improve smooth and uninterrupted deposition. Various embodiments may substantially reduce or eliminate jams proximate to the glass transition zone (GTZ) in the nozzle, especially jams related to filament plug formation in the GTZ of the nozzle.

The filament liner may be formed of a material that presents substantially low friction or abrasion to resist advance of a filament disposed in the liner. Examples of filament liners may include, for example, PTFE. Examples of filament materials that may benefit from the reduced friction liner may include, by way of example and not limitation, materials formed at least in part of plastics such as ABS, TPU, and PTFE.

In the depicted figure, a filament path 1300 is defined through a lumen through a filament tube liner 1305 extending from a proximal end (not shown) at which a filament may be inserted into the filament tube liner 1305, and extending into the heat sink assembly. In this embodiment, the heat sink assembly includes a groove mount 1310 and a heat sink. The heat sink includes a set of vertically spaced shield mount fins 1315a, 1315b, a set of shield mount fin grooves 1320a, 1320b on each of the shield mount fins 1315a, 1315b, respectively, and a set of heat sink radiator fins 1325.

Distal to the heat sink is a nozzle. In various embodiments, the nozzle may be a rigid form having a substantially low resistance to heat transfer, such as for example brass, aluminum, stainless steel, or other metallic-containing material. At a proximal end of the nozzle is a nozzle heat brake 1330, formed as a section of the nozzle with a thinned wall. The reduced material thickness may exhibit a higher thermal resistance to transfer of heat from the distal end to the proximal end of the nozzle. At its distal end, the filament path 1300 terminates in a nozzle tip 1335. At the proximal end of the nozzle, located, in the depicted embodiment, and proximal from the heat brake 1330, in a section having a thick wall outer diameter, disposed on an outer circumferential surface is a nozzle tool flat 1340 adapted for turning the nozzle with a wrench or similar tool. In various embodiments, turning the nozzle may threadingly couple or decouple the nozzle to corresponding threads in the heat sink.

From the point of insertion into a lumen defined in and through the heat sink, a liner extends distally and is, as depicted, abutting a liner seat 1345. The liner seat 1345 comprises a shoulder formed at a step change in an inner diameter, where at the liner seat, the inner diameter of the wall surrounding the filament path decreases. In some embodiments, the inner diameter distal of the liner seat 1345 may present little or substantially no resistance to advance of the filament. For example, the inner diameter of the lumen distal of the liner seat 1345 may be nominally large enough, for example, to the outer diameter of the filament with low friction as the filament advances.

Surrounding the distal portion of the nozzle is a heater block 1350. In various examples, the heater block may be, for example, metal such as stainless steel or aluminum, and may be a relatively weak heat conductor. The heater block 1350 slides onto the nozzle, and is held in position on the nozzle by set screws that engage the outer diameter of the nozzle through a set of four laterally-oriented threaded holes drilled in the heater block 1350. The heater block 1350 further includes a heat element receptacle 1355 to receive a heat element (e.g., resistive element) that acts as the heat source for melting the filament before it exits the nozzle tip 1335. To provide control over the temperature applied to melt the filament, the heater block 1350 further includes a temperature sensor receptacle 1360 to receive a temperature sensor. The temperature sensor may generate a temperature feedback signal to a temperature controller, so that the filament melt and deposition temperature can be accurately controlled. Improved temperature control may advantageously improve safety of the overall system and performance of the nozzle, and, ultimately the resulting quality of the apparatus formed by deposition via the nozzle. To provide for over-temperature protection, the depicted embodiment further includes a set of auxiliary mounting holes 1365a-1365c. In some embodiments, these mounting holes may be used to attach to the heat sink auxiliary accessories, such as a Thermal Cut-off. Examples of such auxiliary accessories are described in further detail with reference to FIG. 12.

At a proximal end of the nozzle is a nozzle threaded coupling 1370 to threadingly couple the nozzle to the heat sink. In accordance with various embodiments, hot end nozzles may be rapidly swapped out using a wrench to work against the flat 1340 to remove one nozzle and attach another nozzle. For example, when switching filaments from a low melt temperature filament to a higher melt temperature filament, various embodiments may yield performance advantages by changing the nozzle design from a low temperature embodiment to a high temperature embodiment, as will be next described with reference to FIG. 14. Such advantages may include, for example, substantially low resistance filament liner in the filament path extending up to, in, or through the glass transitions zone (GTZ) for filaments with a range of melt temperatures.

In various embodiments, an improved method of inserting and installing a filament liner may advantageously reduce or eliminate leakage of molten filament around the distal end of the filament tube liner 1305 proximate the liner seat 1345, and in a radial direction outward from the intended filament path. Such end leakage around the end of the filament tube liner 1305 may contribute to degraded performance.

In an illustrative example, a method to substantially reduce or eliminate such radial leakage of melting filament around an end of the filament tube liner 1305 may begin with a step of advancing the filament tube liner 1305 along the filament path 1300 until the distal end of the liner bottoms out on the shoulder that forms the liner seat 1345 in the nozzle. Then, the proximal end of the filament tube liner 1305 may be held in place by a fitting (e.g., a push to fit fitting—not shown) that resists reversal of the liner's advance. Next, the operator loosens the nozzle by partially unscrewing the nozzle at its nozzle threaded coupling 1370. Advancing the nozzle will create a gap between the end of the filament tube liner 1305 and the liner seat 1345. With the nozzle partially advanced, the filament tube liner 1305 is again advanced to seat the filament tube liner 1305 on the liner seat 1345. With the filament tube liner 1305 distal end seated again, the operator re-tightens the nozzle until the nozzle is securely tightened again to the heat sink via nozzle threaded coupling 1370. In retightening the slightly over-advanced liner, the liner will be compressed between the proximal fitting and the liner seat 1345. This will provide a tighter seal around the end of the filament tube liner 1305 that may substantially reduce or eliminate radial flow of filament material around the end of the filament tube liner 1305.

Figure 14A:
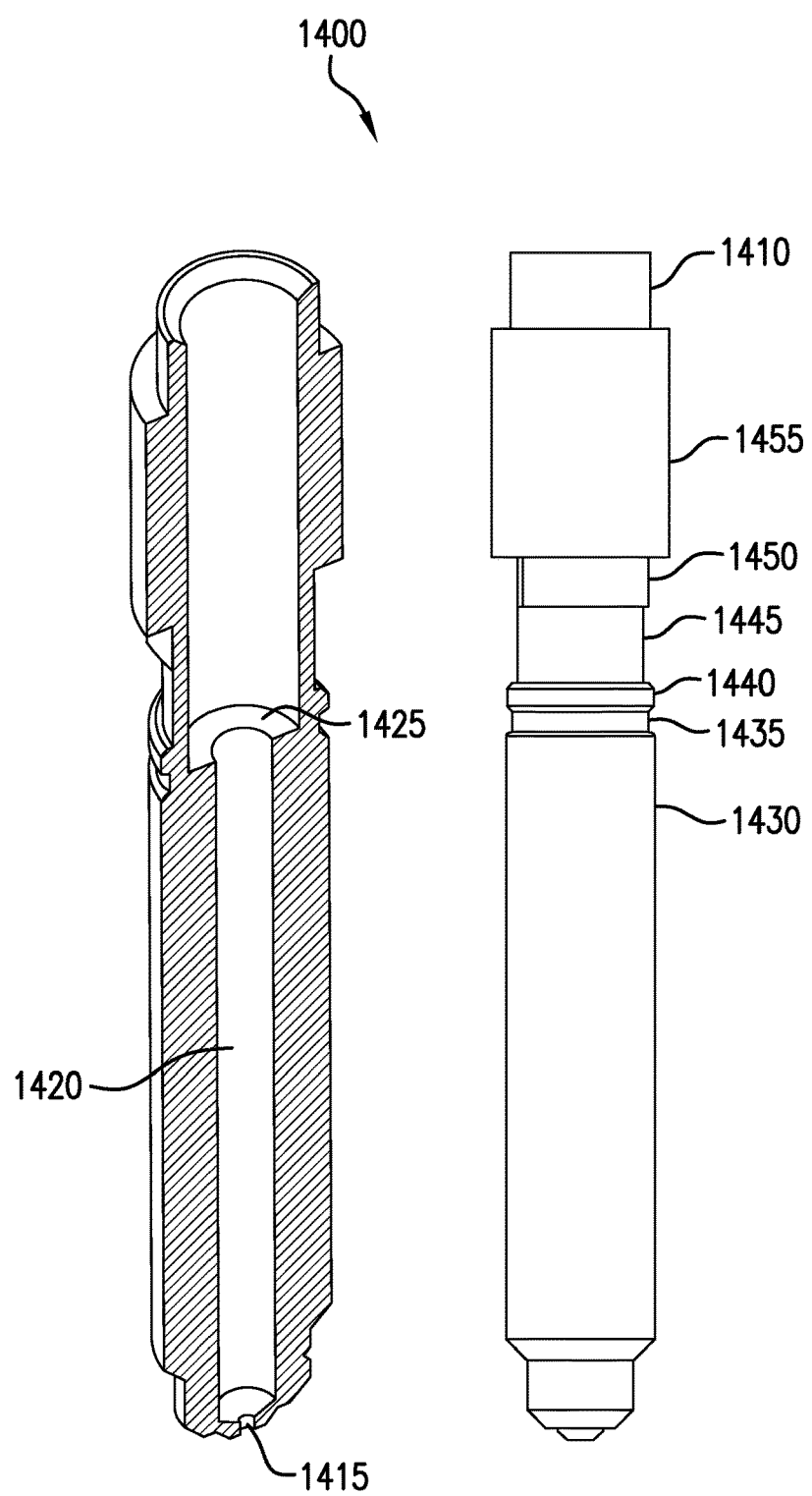
FIGS. 14A-14B depict front and back perspective cross section views of an exemplary high temperature nozzle and an exemplary low temperature nozzle, respectively.
Figure 14B:
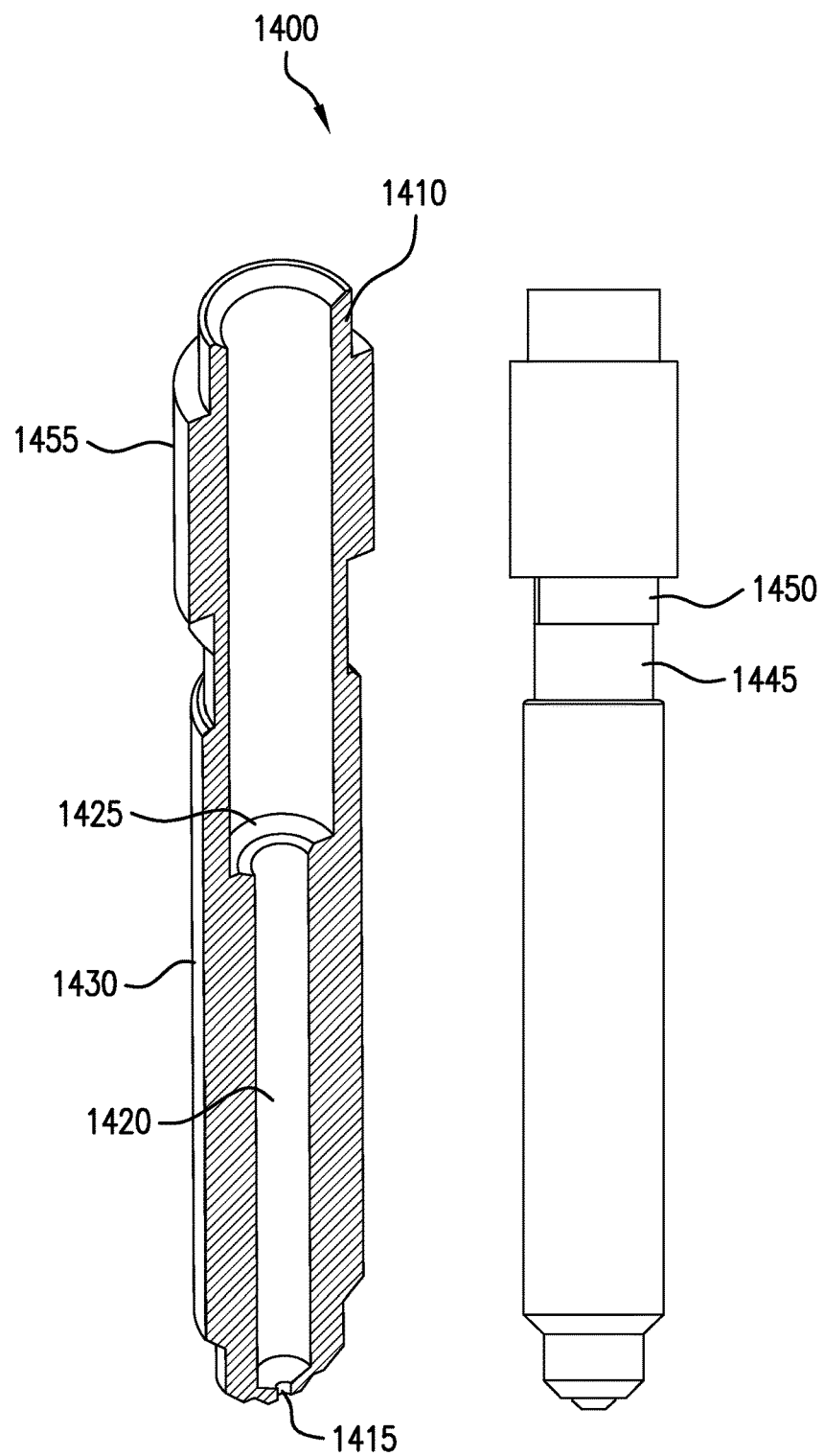

FIG. 14A-14B depict front and back perspective cross section views of an exemplary high temperature nozzle and an exemplary low temperature nozzle, respectively.

In the depicted example, hi temp nozzle 1400 and a low temp nozzle 1405 are shown. Each of the nozzles 1400, 1405 defines an interior filament path that extends from an aperture near a nozzle threaded coupling 1410 to a nozzle tip 1415. The filament path includes a nozzle melt chamber 1420 that contains molten filament material prior to deposition via the nozzle tip 1415.

In or near the GTZ, during operation, the filament path passes through a liner seat 1425 portion of the nozzle, examples of which are described in further detail with reference to FIGS. 13A-13B. In the depicted example, the liner seat 1425 in the high temperature nozzle 1400 is located more proximal compared to the more distally located liner seat 1425 of the lower temperature nozzle. This differential in position corresponds to the temperature profile of the nozzle, where the PTFE liner in some embodiments terminates in a zone where the temperatures that it must bear will not affect the performance of the liner.

On an exterior surface, each of the nozzles 1400, 1405 includes a nozzle chamber wall 1430 surrounding the melt cavity 1420 having a first outer diameter. Proximal of the melt cavity 1420 is a heat brake 1435 defining a section of reduced wall thickness by virtue of the reduced outer diameter, thereby providing a heat brake to promote a significant temperature differential across the heat brake 1435. Proximal from the heat brake 1435 on the high temperature nozzle 1400 is a heat brake radiator 1440, which may promote the dissipation of heat that flows through the heat brake. In some embodiments, the high temperature nozzle may include a second section of a heat brake 1445.

Proximal from the heat brake(s) 1435, 1445 is a nozzle tool flat 1450 having a reduced outer diameter of a size greater than the outer diameters of the heat break 1435, 1445 but less than the outer diameter of the chamber wall 1430, for example. Between the nozzle tool flat 1450 and a proximal top aperture is a nozzle body wall 1455, which may have a nominal outer diameter substantially similar, in some embodiments, to the outer diameter of the nozzle chamber wall 1430.

On the one hand, lower temperature nozzles may advantageously reduce filament path friction for filaments that have lower melt temperatures. For example, some filaments may have a melt temperature below the melt or Glass Transition Temperature of the material used to make the filament tube liner 1305, allowing the use of low friction PTFE liner closer to or even in or through the GTZ of the lower temperature filament.

On the other hand, higher temperature nozzles may advantageously reduce filament path friction for filaments that have higher melt temperatures. For example, filaments that have a melt temperature above the melt or Glass Transition Temperature of the material used to make the filament tube liner 1305, may allow the use of low friction PTFE liner closer to the GTZ of the lower temperature filament.

A primary difference between a high temperature nozzle and a low temperature nozzle is the location of the liner seat 1425. Lower temperature designs have the liner seat positioned closer to the distal end of the filament path. This allows the filament liner tube to extend as deeply into the nozzle as permitted by the operating melt temperature. This may advantageously provide a low resistance path for advancing the filament proximate or even past the GTZ, so that any plug that may form due to glass transition will experience uniformly low friction (e.g., slippery) path as it advances into the nozzle melt chamber 1420.

In some embodiments, a second difference between the low temperature and high temperature nozzle designs may include the heat brake design. Higher temperatures call for managing the thermal profile along the nozzle such that the nozzle temperature transitions very rapidly as a function of distance along the nozzle. Accordingly, a high dT/dx along the nozzle implies that the proximal end of the nozzle will be much cooler than the distal end. During operation, the hot end maintains the operating melt temperature in the nozzle melt chamber 1420. The heat brake attenuates the thermal energy that leaks proximally. Heat brake features in the nozzle may advantageously reduce the temperatures at a proximal portion of the nozzle, thereby permitting the filament tube liner to extend deeper into the nozzle without melting. Inserting the filament tube liner as deeply as possible into the nozzle may advantageously mitigate the frictional resistance, abrasion and plug formation risk for the filament. In various examples, higher temperature filaments may call for a higher temperature nozzle configuration, in which the liner seat is more proximal, and further back from the GTZ to avoid melting or over softening of the filament liner tube itself.

Accordingly, in various embodiments, proper selection of nozzle design for the heater block temperature as required to melt the filament may permit extension of a low resistance filament tube liner substantially near, in, or through the GTZ based on nozzle operating temperature profile to melt the filament.

In various embodiments, the liner seat may be configured to position the distal end of the low-friction liner at a position that will be at or below the melting temperature of the liner material. PTFE liner may typically soften or melt around approximately 265 degrees Celsius.

Figure 15:
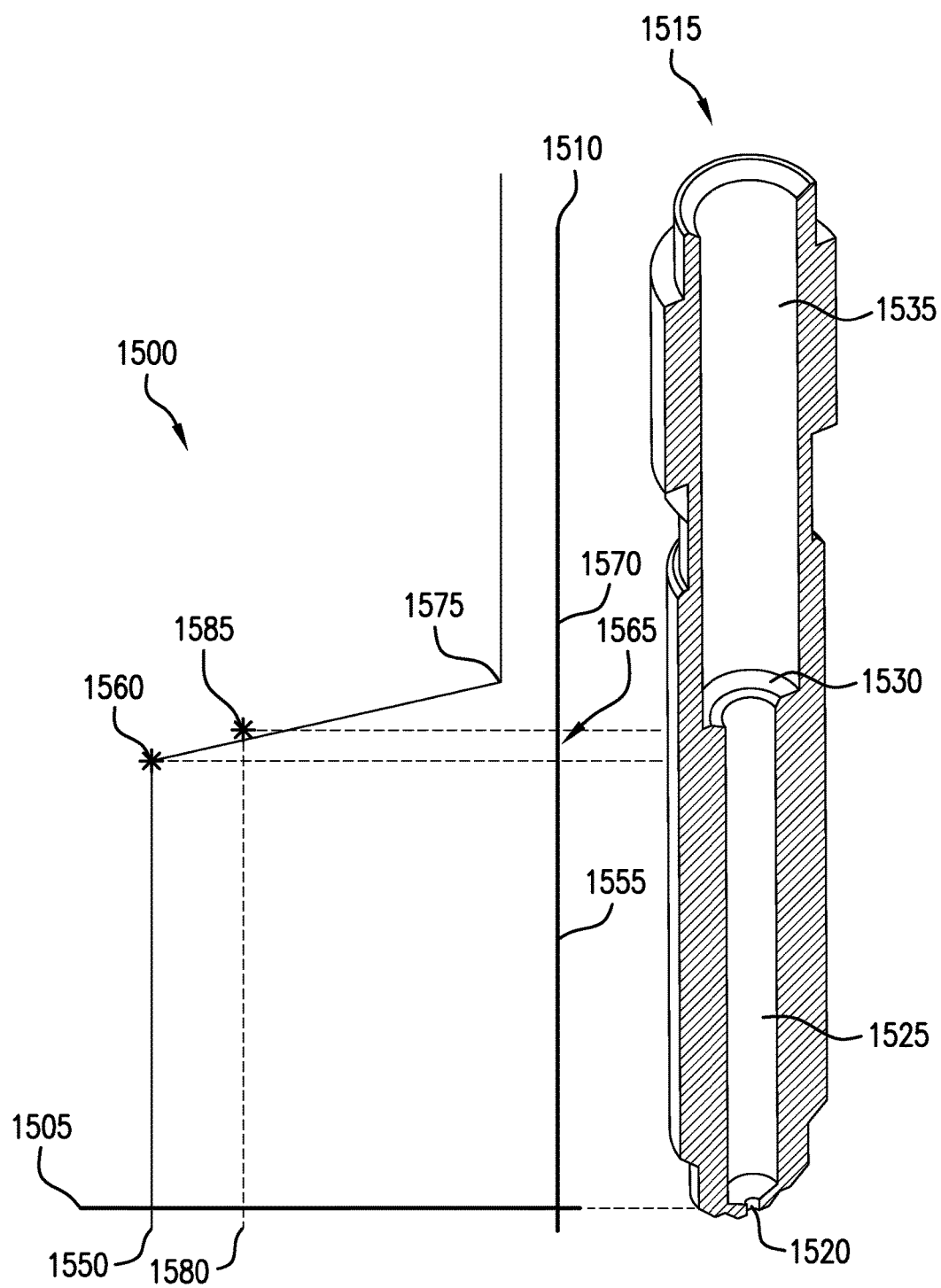
FIG. 15 depicts a graph depicting a temperature profile for an exemplary hot end assembly.
Figure 16A:
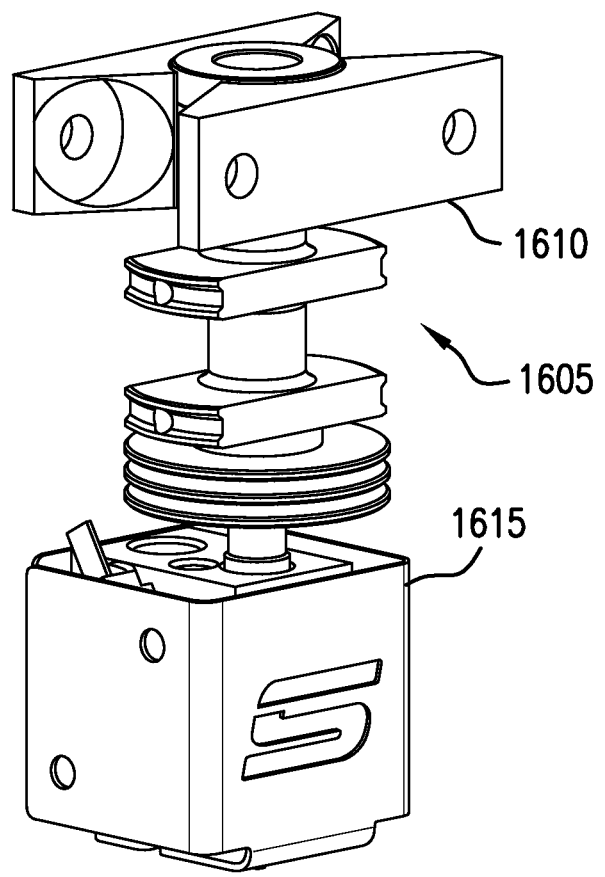
FIGS. 16A-16D depict perspective views of an exemplary hot end assembly kit with partial removal of elements to reveal internal components.
Figure 16B:
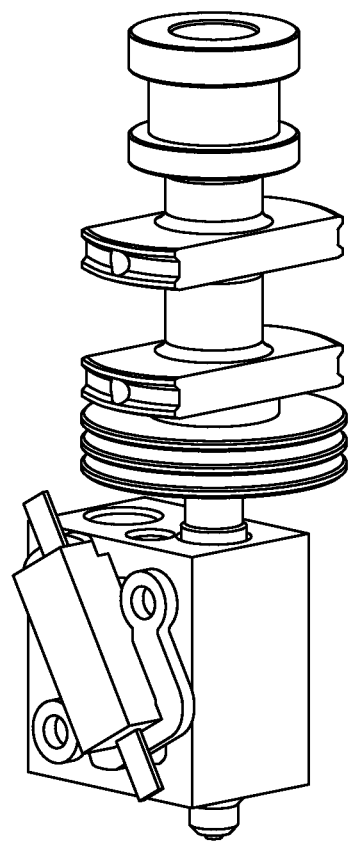
Figure 16C:
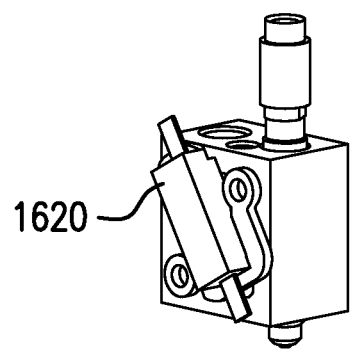
Figure 16D:
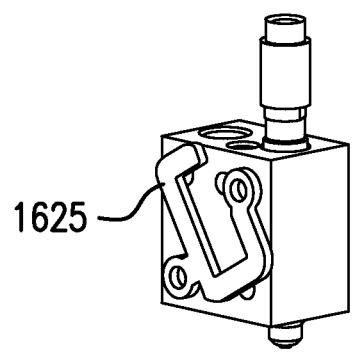

FIG. 15 depicts a graph depicting a temperature profile for an exemplary hot end assembly.

In various embodiments, the liner seat is configured to position the distal end of the low-friction liner at a position that will, under normal operating conditions, be at or below the melting temperature of the liner material.

In the depicted graph, a Thermal Profile 1500 includes a vertical axis Temperature 1505 versus a horizontal axis Nozzle position 1510. The nozzle position corresponding to the key graph has key feature points: a Nozzle threaded coupling 1515, a Nozzle tip 1520, a Nozzle melt chamber 1525, a Nozzle Liner Seat 1530, and a Nozzle liner chamber 1535. On the vertical axis is depicted an exemplary filament melted temperature 1550 representative of a relatively uniform temperature for a targeted filament liquid zone 1555 in the melt chamber. At a melt transition point 1560, the temperature sharply decreases as a function of distance through a Glass transition zone 1565 for this temperature profile and this filament and operating temperature. As the temperature falls indicative of a solid phase filament zone 1570, the temperature approaches an ambient temperature point 1575.

A second (dashed) plot line intersects the temperature axis at a filament liner melt temperature 1580. At vertex 1585, the vertex point indicates that the end of the filament liner is aligned with the Nozzle liner seat 1530. The temperature profile of the filament is properly shown to be at a temperature below the filament liner melt point 1585 at a position corresponding to the nozzle liner seat 1530.

FIGS. 16A-16D depict perspective views of an exemplary hot end assembly with partial removal of elements to reveal internal components.

In the depicted figure, a hot end assembly 1605 includes a groove mount 1610 at a proximal connection end, and a heat shield 1615.

When the heat shield 1615 is removed, the hot end includes a temperature protection module 1620 mounted to the heater block assembly 1235 using a bracket for temperature protection module 1625.

Figure 17:
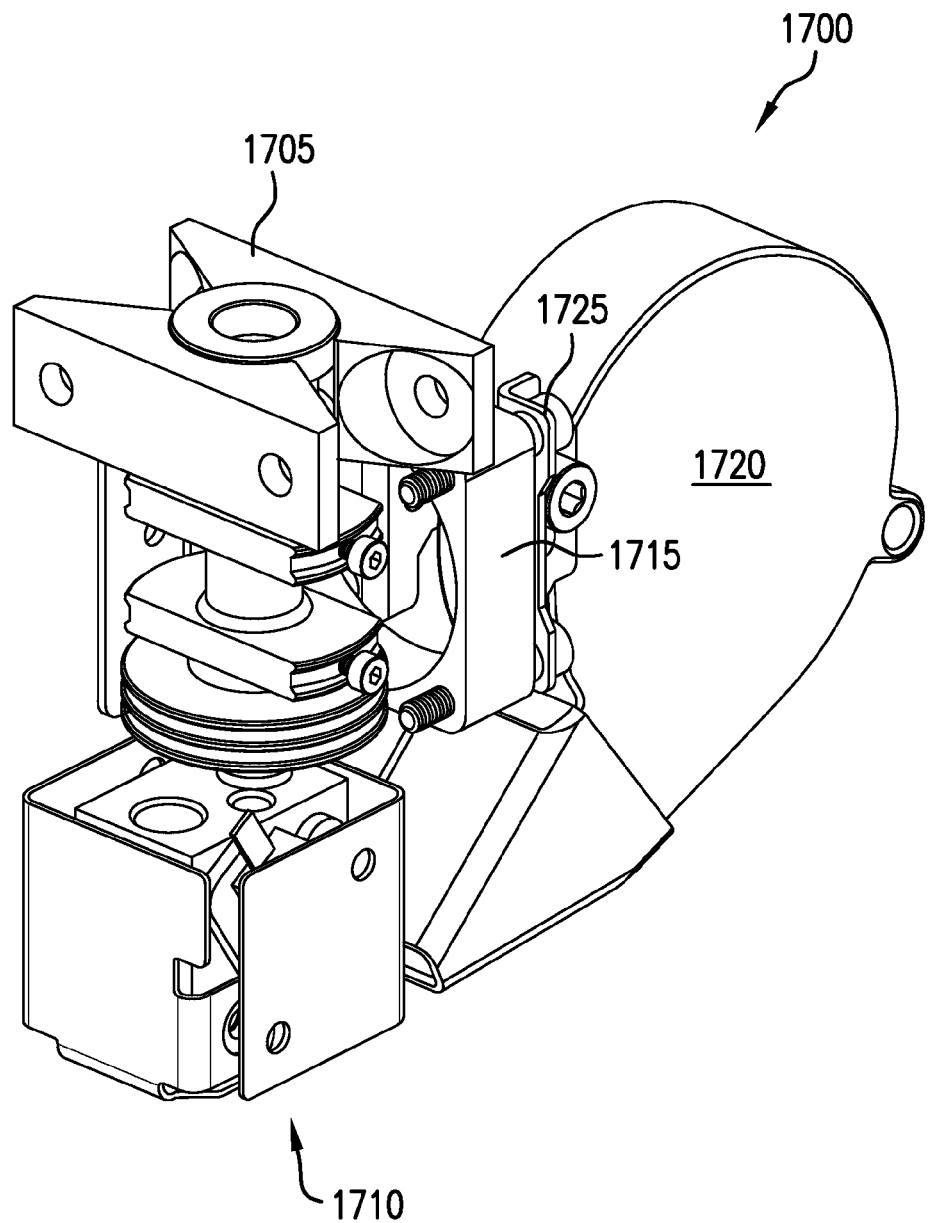
FIG. 17 depicts a partial perspective view of an exemplary hot end assembly kit with partial removal of elements to reveal internal components.

FIG. 17 depicts a partial perspective view of an exemplary hot end assembly kit with partial removal of elements to reveal internal components.

In the depicted figures, a hot end assembly kit 1700 coupled to a groove mount 1705 that captures a hot end assembly 1710. In some embodiments, the kit 1700 integrates forced air thermal management components, including a heat sink fan 1715, a dryer 1720 coupled to the heat sink fan 1715 via a dryer bracket 1725.

Figure 18A:
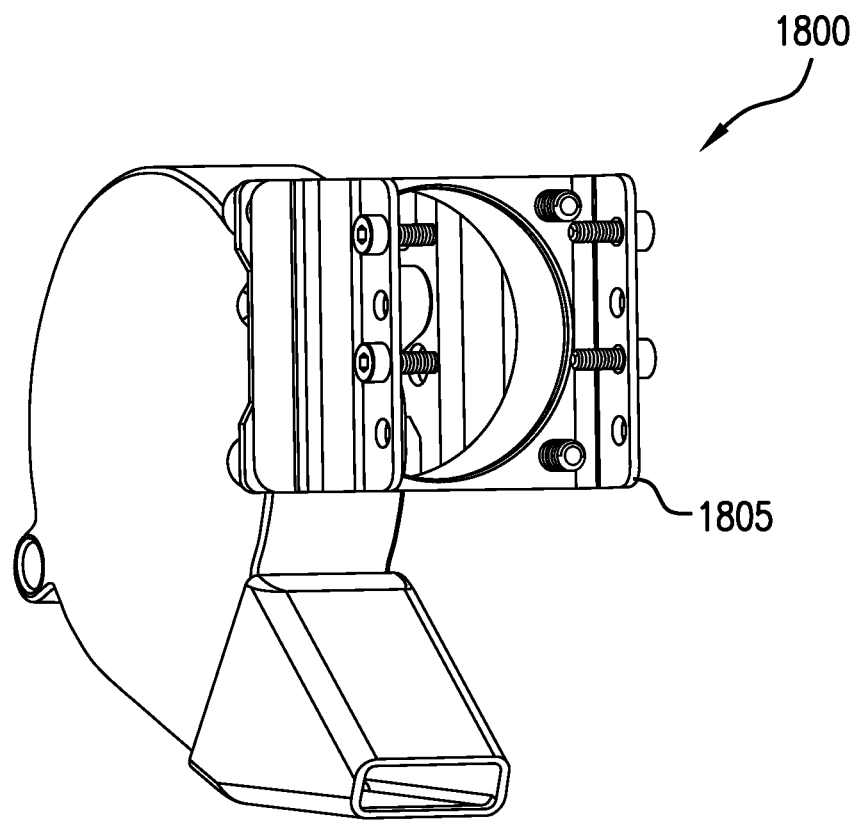
FIGS. 18A-18C depict partial perspective views of an exemplary forced cooling assembly.
Figure 18B:
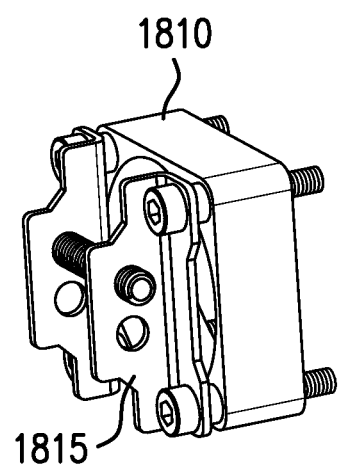
Figure 18C:
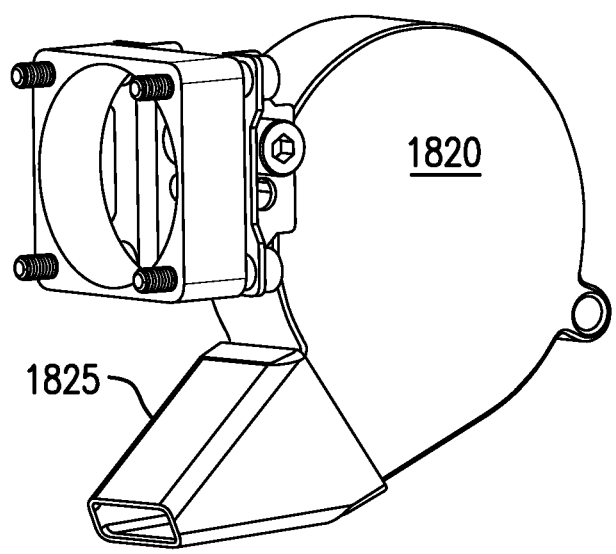
Figure 19:
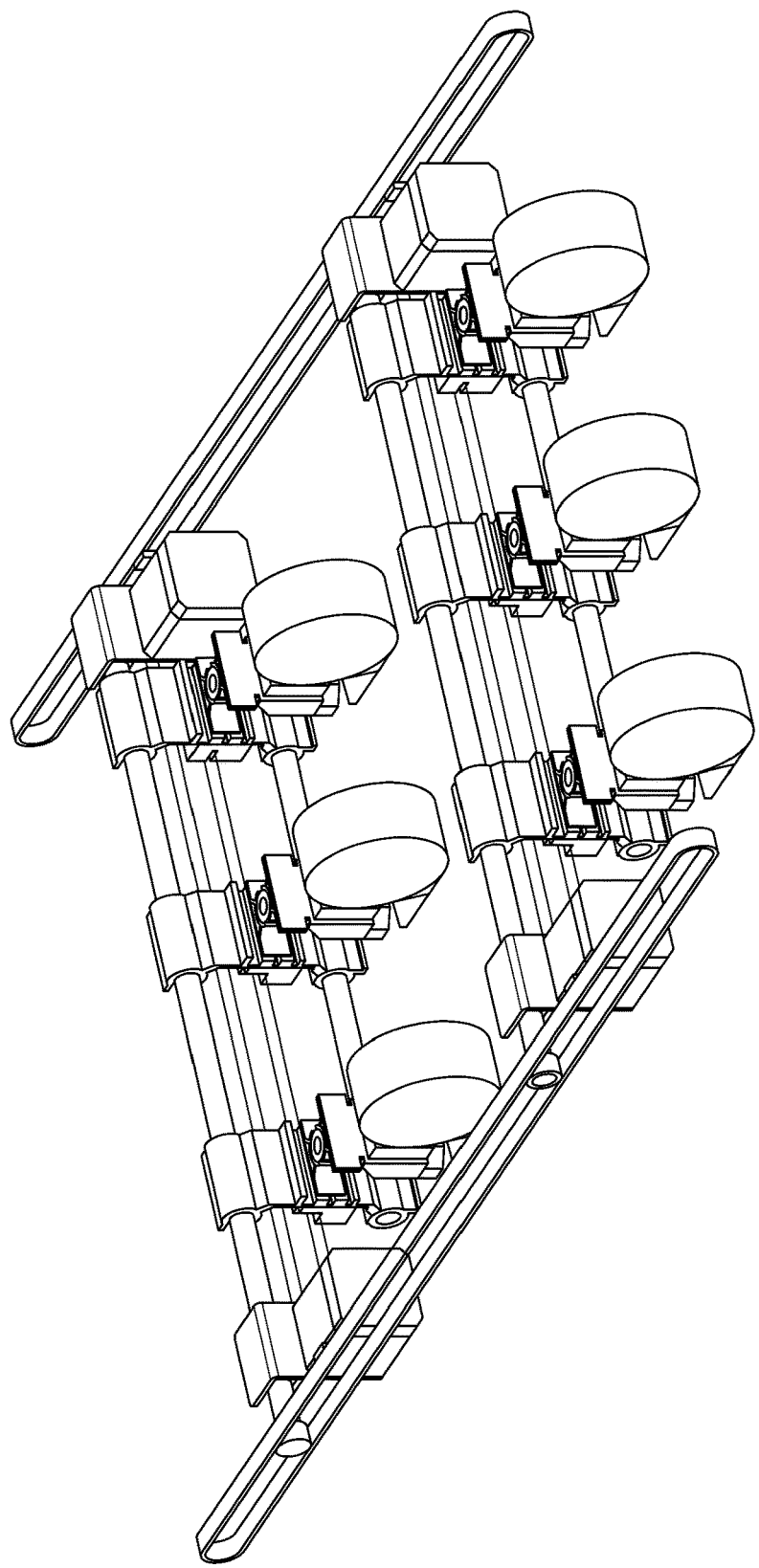
FIG. 19 depicts an exemplary multiple head gantry system.

FIGS. 18A-18C depict partial perspective views of an exemplary forced cooling assembly. In the depicted figure, a forced cooling assembly 1800 includes a heat sink bracket 1805 that attaches to the heat sink (not shown). The heat sink bracket supports an axially directed heat sink fan 1810 that forces air across the heat sink assembly, such as the assembly 1225 of FIG. 12. Outboard of the axial heat sink fan 1810 is a dryer bracket 1815 mounted to an inlet face of the fan and to a housing of a dryer 1820. The dryer 1820 has a dryer nozzle 1825 to gently direct air over deposited material to promote cooling and curing.

FIG. 19 depicts an exemplary multiple head gantry system. In the depicted embodiment, multiple X-axis gantries are synchronously displaced in the y-axis direction by the y-axis drive system. By way of example and not limitation, a printer may include 3 gantries extending along the x-axis in some embodiments. Each gantry may support any suitably spaced apart number (e.g., 4) of deposition means operable for simultaneous operation with synchronous x and y-axis position profiles. In some embodiments, a printer may have, for example, 10 heads slaved to the x-axis drive system. In some embodiments, a printer may include 5 slaved x-axis gantries with two means for dispensing releasably coupled to each gantry. Such embodiments may advantageously yield certain advantages, such as multiplying the number of parts that can be completed or formed in the time it takes to complete one part. In various embodiments, multiple print heads may be ganged or slaved to a common x-axis drive mechanism, which may include, either singly or in combination, a belt, rack and pinion, threaded rod, spectra fishing line, or the like.

Although various embodiments have been described with reference to the Figures, other embodiments are possible. Various embodiments may software that is modular. For example, standard software interfaces may permit users to write modules that replace standard control modules. A user may desire to use a new deposition material that requires a new deposition technique. The user may be satisfied with the X, Y, and Z control systems, but desire to replace the filament drive system with a new deposition control system, for example. The user may use the software hooks provided by the standard deposition control modules and write new modules using these hooks. In some embodiments, standard parameter passing may be performed.

Various embodiments may have various coupling members on frame units to facilitate a user's ability to configure the 3D printer. For example, various threaded holes may be presented on a frame member to facilitate the attachment of deposition material handling devices. In some embodiments, frame spanning panels may be mounted to a frame, the frame spanning panels being customized to provide support for custom equipment.

In an illustrative embodiment, the axes control assemblies may be operated in a cooperative fashion to produce 3D products using vector and/or curvilinear deposition techniques. For example. A diagonal span between two pedestals of different heights may be bridged with a coordinated x-axis and z-axis control. The deposit may be initiated with the extrusion nozzle located on the lower of the two pedestals. The stage may simultaneously move in the lateral direction of the other pedestal while lowering the parts tray so as to land just atop the taller pedestal. Similarly curved spans or shapes can be traced using coordinated axes control. Fast Z-control can be realized using belt driven Z-axis assemblies as described above. Such fast control of the three axes may minimize the time necessary to create 3D products.

Some aspects of embodiments may be implemented as a computer system. For example, various implementations may include digital and/or analog circuitry, computer hardware, other sensors (e.g. temperature sensors), firmware, software, or combinations thereof. Apparatus elements can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Some embodiments can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example and not limitation, both general and special purpose microprocessors, which may include a single processor or one of multiple processors of any kind of computer. Generally, a processor will receive instructions and data from a read-only memory or a random access memory or both. The essential elements of a computer are a processor for executing instructions and one or more memories for storing instructions and data. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and, CD-ROM and DVD-ROM disks. The processor and the memory can be supplemented by, or incorporated in, ASICs (application-specific integrated circuits). In some embodiments, the processor and the member can be supplemented by, or incorporated in hardware programmable devices, such as FPGAs, for example.

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. An exemplary embodiment may be implemented in a computer system that includes a graphical user interface and/or an Internet browser. To provide for interaction with a user, some implementations may be implemented on a computer having a display device, such as an LCD (liquid crystal display) monitor for displaying information to the user, a keyboard, and a pointing device, such as a mouse or a trackball by which the user can provide input to the computer. For example, wearable devices, such as Google Glass, may facilitate input and/or output operations between a user and a system.

In various implementations, the system may communicate using suitable communication methods, equipment, and techniques. For example, the system may communicate with compatible devices (e.g., devices capable of transferring data to and/or from the system) using point-to-point communication in which a message is transported directly from the source to the receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, and the computers and networks forming the Internet. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Firewire, ATA/IDE, RS-232, RS-422, RS-485, 802.11a/b/g/n, Wi-Fi, Ethernet, IrDA, FDDI (fiber distributed data interface), token-ring networks, or multiplexing techniques based on frequency, time, or code division. Some implementations may optionally incorporate features such as error checking and correction (ECC) for data integrity, or security measures, such as encryption (e.g., WEP) and password protection.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A layer deposition system to form a plurality of 3D products simultaneously, the system comprising:
   a deposition frame housing having first opposing lateral members extending orthogonal to a first axis, and second opposing lateral members extending orthogonal to a second axis coplanar with and orthogonal to the first axis;
   a carriage assembly extending between the first opposing lateral members and parallel to the first axis;
   a substrate surface extending between the first opposing lateral members and between the second opposing lateral members;
   a plurality of deposition modules, each separated from adjacent ones of the plurality of deposition modules by user-predetermined spacings, and operable to deposit material through a nozzle to form a three dimensional product supported by the substrate surface;
   a plurality of attachment interfaces that each releasably attach a corresponding one of the plurality of deposition modules to the carriage assembly,
   a first axis drive coupled to synchronously displace the plurality of deposition modules a predetermined distance along the first axis;
   means for releasably ganging the plurality of deposition modules directly to a common x-axis drive mechanism at the user-predetermined spacings, wherein the first axis drive comprises the common x-axis drive mechanism,
   a second axis drive coupled to synchronously displace the plurality of deposition modules a predetermined distance along the second axis; and,
   a third axis drive couple to synchronously create a relative displacement between each of the plurality of deposition modules and the substrate surface along a third axis orthogonal to both the first axis and the second axis.

2. The system of claim 1, wherein the deposition frame housing defines a first interior volume through which the substrate surface is vertically displaceable in response to operation of the third axis drive.

3. The system of claim 2, further comprising a first modular base frame having third opposing lateral members extending orthogonal to the first axis, and fourth opposing lateral members extending orthogonal to the second axis and defining a second interior volume through which the substrate surface is vertically displaceable in response to operation of the third axis drive.

4. The system of claim 3, wherein the first modular base frame is stackable underneath the deposition frame housing.

5. The system of claim 4, wherein the first modular base frame defines a second interior volume that substantially aligns with the first interior volume when the deposition frame housing is stacked on the first modular base frame.

6. The system of claim 1, wherein the carriage assembly releasably engages without tools to at least one of the plurality of deposition modules.

7. The system of claim 1, further comprising a plurality of filament supply modules operable to simultaneously supply a solid filament material to each one of the nozzles of the deposition modules.

8. The system of claim 1, wherein the carriage assembly comprises at least one guide rod to which at least one of the plurality of deposition modules is configured to releasably attach without tools at a user-predetermined separation between adjacent ones of the plurality of deposition modules.

9. The system of claim 8, wherein at least one of the deposition modules is configured to provide slidable engagement parallel to the first axis and along the at least one guide rod.

10. The system of claim 1, wherein the first axis drive releasably engages each one of the plurality of deposition modules to impart synchronous displacement in the direction of the first axis.

11. A layer deposition apparatus to form a plurality of 3D products simultaneously, the system comprising:
- a deposition frame housing having first opposing lateral members extending orthogonal to a first axis, and second opposing lateral members extending orthogonal to a second axis coplanar with and orthogonal to the first axis;
- a carriage assembly extending between the first opposing lateral members and parallel to the first axis;
- a substrate surface extending between the first opposing lateral members and between the second opposing lateral members;
- a plurality of means for depositing, each separated from adjacent ones of the plurality of deposition means by user-predetermined spacings, and operable to deposit material through a nozzle to form a three dimensional product supported by the substrate surface;
- a plurality of attachment interfaces that each releasably attach a corresponding one of the plurality of deposition modules to the carriage assembly,
- a first axis drive coupled to synchronously displace the plurality of deposition means a predetermined distance along the first axis;
- means for releasably ganging the plurality of deposition means directly to a common x-axis drive mechanism at the user-predetermined spacings, wherein the first axis drive comprises the common x-axis drive mechanism,
- a second axis drive coupled to synchronously displace the plurality of deposition means a predetermined distance along the second axis; and,
- a third axis drive couple to synchronously create a relative displacement between each of the plurality of deposition means and the substrate surface along a third axis orthogonal to both the first axis and the second axis,
- wherein the carriage assembly comprises at least one guide rod to which at least one of the plurality of deposition means is configured to releasably attach without tools at a user-predetermined separation between adjacent ones of the plurality of deposition means.

12. The system of claim 11, wherein the deposition frame housing defines a first interior volume through which the substrate surface is vertically displaceable in response to operation of the third axis drive, and further comprising a first modular base frame having third opposing lateral members extending orthogonal to the first axis, and fourth opposing lateral members extending orthogonal to the second axis and defining a second interior volume through which the substrate surface is vertically displaceable in response to operation of the third axis drive.

13. The system of claim 12, wherein the first modular base frame is stackable underneath the deposition frame housing, and defines a second interior volume that substantially aligns with the first interior volume when the deposition frame housing is stacked on the first modular base frame.

14. The system of claim 11, further comprising a plurality of filament supply modules operable to simultaneously supply a solid filament material to each one of the nozzles of the deposition means.

* * * * *